United States Patent
Marukame et al.

(10) Patent No.: US 12,093,807 B2
(45) Date of Patent: Sep. 17, 2024

(54) NEURAL NETWORK, METHOD OF CONTROL OF NEURAL NETWORK, AND PROCESSOR OF NEURAL NETWORK

(71) Applicants: KABUSHIKI KAISHA TOSHIBA, Tokyo (JP); Toshiba Information Systems (Japan) Corporation, Kawasaki (JP)

(72) Inventors: Takao Marukame, Tokyo (JP); Kazuo Ishikawa, Kawasaki (JP); Junichi Sugino, Kawasaki (JP); Toshimitsu Kitamura, Kawasaki (JP); Yutaka Tamura, Kawasaki (JP); Koji Takahashi, Kawasaki (JP)

(73) Assignees: Kabushikiki Kaisha Toshiba, Tokyo (JP); Toshiba Information Systems (Japan) Corporation, Kawasaki (JP)

( * ) Notice: Subject to any disclaimer, the term of this patent is extended or adjusted under 35 U.S.C. 154(b) by 776 days.

(21) Appl. No.: 16/891,079

(22) Filed: Jun. 3, 2020

(65) Prior Publication Data
US 2020/0380347 A1    Dec. 3, 2020

(30) Foreign Application Priority Data
Jun. 3, 2019    (JP) .................. 2019-103803

(51) Int. Cl.
*G06N 3/063*    (2023.01)
*G06F 7/544*    (2006.01)

(52) U.S. Cl.
CPC ........... *G06N 3/063* (2013.01); *G06F 7/5443* (2013.01)

(58) Field of Classification Search
CPC ................ G06N 3/063; G06F 7/5443
See application file for complete search history.

(56) References Cited

U.S. PATENT DOCUMENTS 5,131,072 A * 7/1992 Yoshizawa ............. G06N 3/065
706/38
6,067,536 A * 5/2000 Maruyama ............. G06N 3/063
706/15

(Continued)

FOREIGN PATENT DOCUMENTS

JP    02-181284    7/1990
JP    04-040581    2/1992

(Continued)

OTHER PUBLICATIONS

Japanese Office Action for corresponding JP Application No. 2019-103803, Aug. 31, 2021 (w/ English machine translation).

(Continued)

*Primary Examiner* — Li B. Zhen
*Assistant Examiner* — Moriam Mosunmola Godo
(74) *Attorney, Agent, or Firm* — Finnegan, Henderson, Farabow, Garrett & Dunner, LLP

(57) ABSTRACT

A neural network not requiring massive changes in configuration when changing the number of stages (number of levels) of the neural network. This neural network is provided with at least one neuron core 10 performing an analog multiply-accumulate operation and a weight-value-supply control unit 30 supplying the weight value to the neuron core 10. This neural network is subjected to control processing by a control-processor unit 40 controlling the supply of the weight value from said weight-value-supply control unit 30 in synchronization with the timing of the analog multiply-accumulate operation of the neuron core 10, and processing the data output from the neuron core 10 at every analog multiply-accumulate operation performed by said neuron core as serial data and/or parallel data.

10 Claims, 23 Drawing Sheets

(56) References Cited

U.S. PATENT DOCUMENTS

| | | | |
|---|---|---|---|
| 10,360,971 B1* | 7/2019 | Hokenmaier | G06N 3/063 |
| 2018/0204118 A1 | 7/2018 | Ono | |
| 2018/0276035 A1* | 9/2018 | Henry | G06N 3/045 |
| 2019/0342564 A1* | 11/2019 | Kurokawa | H03K 3/3562 |
| 2020/0160158 A1* | 5/2020 | Okamoto | G06F 7/5443 |

FOREIGN PATENT DOCUMENTS

| | | |
|---|---|---|
| JP | 6-259585 | 9/1994 |
| JP | 9-101944 | 4/1997 |
| JP | 2001-117900 | 4/2001 |
| JP | 2018-116469 | 7/2018 |

OTHER PUBLICATIONS

Japanese Office Action for corresponding JP Application No. 2019-103803, Jun. 1, 2021 (w/ English machine translation).

* cited by examiner

FIG.3H

| Advance | Give weights w0, w1, w2 to registers 32-0, 32-1, 32-2 |||||
|---|---|---|---|---|---|
| Step | TIME | Selector 31 output | Selector 52 output | Data output terminal Y | Register 51-0 |
| S1 | 0 | Select register 32-0 Output value w0 | Select input x0, value x0 | (operation performed) | |
| S2 | t | Value w0 | Value x0 | Intermediate result value x1 (output data y0) | |
| S3 | | Value w0 | Value x0 | Intermediate result value x1 (output data y0) | Store, value x1 (y0) |
| S4 | | Select register 32-1 Output value w1 | Select register 51-0, value x1(y0) | (operation performed) | Value x1(y0) |
| S5 | t × 2 | Value w1 | Value x1 | Intermediate result value x2 (output data y1) | Value x1(y0) |
| S6 | | Value w1 | Value x1 | Intermediate result value x2 (output data y1) | Store, value x2 (y1) |
| S7 | | Select register 32-2 Output value w2 | Select register 51-0, value x2(y1) | (operation performed) | Value x2(y1) |
| S8 | t × 3 | Value w2 | Value x2(y1) | Final result value y2 | Value x2(y1) |

FIG.4B

| Advance | Give weights w0, w1, w2 to registers 32-0, 32-1, 32-2 | | | | | |
|---|---|---|---|---|---|---|
| Step | TIME | Selector 31 output | Selector 52 output | Output terminal Y | Register 51-0 | Register 51-1 |
| S11 | 0 | Select register 32-0 Output value w0 | Select input x0, value x0 | (operation performed) | | |
| S12 | t | value w0 | value x0 | Intermediate result value x1 (output data y0) | | |
| S13 | | value w0 | value x0 | Intermediate result value x1 (output data y0) | Store, value x1 (y0) | |
| S14 | | Select register 32-1 Output value w1 | Select register 51-0, value x1(y0) | (operation performed) | value x1(y0) | |
| S15 | t×2 | value w1 | value x1 (y0) | Intermediate result value x2 (output data y1) | value x1(y0) | |
| S16 | | value w1 | value x1 (y0) | Intermediate result value x2 (output data y1) | value x1(y0) | Store, value x2 (y1) |
| S17 | | Select register 32-2 Output value w2 | Select register 52-1, value x2(y1) | (operation performed) | value x1(y0) | value x2(y1) |
| S18 | t×3 | value w2 | value x2 (y1) | Final result value y2 | value x1(y0) | value x2(y1) |

FIG.5B

| Advance | | Give weights w0, w1, w2 to registers 32-0, 32-1, 32-2 | | | | | | |
|---|---|---|---|---|---|---|---|---|
| Step | TIME | Selector 31 output | Selector 52 output | Output terminal Y | Register 51-0 | Register 51-1 | Register 51-2 | Register 51-3 |
| S20 | Before | | | | Store value of input terminal x0 | | | |
| S21 | 0 | Select register 32-0, Output value w0 | Select register 51-0, value x0 | | value x0 | | | |
| S22 | t | Value w0 | value x0 | (operation performed) | value x0 | | | |
| S23 | | Value w0 | value x0 | Intermediate result value x1 (output data y0) | value x0 | Store value x1 (y0) | | |
| S24 | | Select register 32-1, Output value w1 | Select register 51-1, value x1(y0) | Intermediate result value x1 (output data y0) | value x0 | Value x1 (y0) | | |
| S25 | t×2 | Value w1 | value x1 | (operation performed) | value x0 | Value x1 (y0) | | |
| S26 | | Value w1 | value x1 | Intermediate result value x2 (output data y1) | value x0 | Value x1 (y0) | Store value x2 (y1) | |
| S27 | | Select register 32-2, Output value w2 | Select register 51-2, value x2(y1) | Intermediate result value x2 (output data y1) | value x0 | Value x1 (y0) | value x2 (y1) | |
| S28 | t×3 | value w2 | value x2 | Final result value y2 | value x0 | Value x1 (y0) | value x2 (y1) | |
| S29 | | | | | | | | Store value x3 (y0) |

FIG. 6B

| Advance | | Give weights w0, w1, w2 to registers 32-0, 32-1, 32-2 | | | | | | | |
|---|---|---|---|---|---|---|---|---|---|
| Step | TIME | Selector 31 output | Selector 52 output | Output terminal Y | Register 51-0 | Register 51-1 | Register 51-2 | Register 51-3 |
| S20 | Before | | | | | | | |
| S21 | 0 | Select register 32-0, Output value w0 | Select register 51-0, value x0 | | Store value x0 from main control unit | | | |
| S22 | t | Value w0 | Value x0 | (operation performed) | Value x0 | | | |
| S23 | | Value w0 | Value x0 | Intermediate result value x1 (output data y0) | Value x0 | | | |
| S24 | | | | Value x1 (y0) | Value x0 | Store value x1 (y0) | | |
| S25 | t×2 | Select register 32-1, Output value w1 | Select register 51-1, value x1 (y0) | | Value x0 | Value x1 (y0) | | |
| S26 | | Value w1 | value x1 | (operation performed) | Value x0 | Value x1 (y0) | | |
| S27 | | Value w1 | value x1 | Intermediate result value x2 (output data y1) | Value x0 | Value x1 (y0) | | |
| S28 | t×3 | Select register 32-2, Output value w2 | Select register 51-2, value x2 (y1) | Value x2 (y1) | Value x0 | Value x1 (y0) | Store value x2 (y1) | |
| S29 | | Value w2 | Value x2 | (operation performed) | Value x0 | Value x1 (y0) | Value x2 (y1) | |
| | | | | Final result value y2 | | Value x1 (y0) | Value x2 (y1) | |
| | | | | | | | | Store value x3 (y0) |

NEURAL NETWORK, METHOD OF CONTROL OF NEURAL NETWORK, AND PROCESSOR OF NEURAL NETWORK

BACKGROUND OF THE INVENTION

1. Field of the Invention

This invention relates to a neural network, a method of control of a neural network, and a processor of a neural network.

2. Description of the Related Art

A conventional neural network performing three parallel operations is, for example, configured as shown in FIG. 1A. That is, this neural network is comprised of neuron cores 1-0, 1-1, and 1-2, three storage devices 2-0, 2-1, and 2-2, and a main control unit 3. Each of the neuron cores 1-0, 1-1, and 1-2 performs the analog operation of the function represented by y=f(x,w) based on input data "x" arriving at a data input terminal X and a weight value "w" arriving at a weight value input terminal W and outputs output data "y" from a data output terminal Y. Note that in this description and the drawings, if the value of the input data "x" input to a neuron core is xn (n=0, 1, 2, 3, . . . ), the input data "x" (xn) or the input data xn, the value xn, etc. are described. Further, if the value of the weight "w" input to a neuron core is wn (n=0, 1, 2, 3, . . . ), the weight value "w"(wn) or weight value wn, value wn, etc. are described. Further, if the value of the output data "y" output from the neuron core is yn (n=0, 1, 2, 3, . . . ), the output data "y"(yn) or the output data yn, Yn etc. are described. Further, when the output data "y" is an intermediate result value used as the input data xn of the next stage neuron core, the intermediate result value xn (output data yn) or the intermediate result value xn (yn) or intermediate result value xn, the value xn (yn), etc. are described. Further tore, if the output data "y" is the final result of this neural network, the result value xn(yn), the result value xn, etc. are described.

For the above operation, the main control unit 3 sets the required weight values w0 to w2 in the storage devices 2-0, 2-1, and 2-2 and supplies the weight values w0 to w2 of these storage devices 2-0, 2-1, and 2-2 respectively to the neuron cores 1-0, 1-1, and 1-2. In this state, the main control unit 3 directs operations so that the input data x0 is supplied to the neuron core 1-0 from the prior stage device 0, the input data x1 is supplied to the neuron core 1-1 from the prior stage device 1, and the input data x2 is supplied to the neuron core 1-2 from the prior stage device 2.

Due to the above, the output data y0 is output from a data output terminal Y0 of the neuron core 1-0 after the elapse of an operation time "t", the output data y1 is output from a data output terminal Y1 of the neuron core 1-1 after the elapse of the operation time "t", and the output data y2 is output from a data output terminal Y2 of the neuron core 1-2 after the elapse of the operation time "t". According to this configuration, to adjust the number of parallel operations, adjustment of the numbers of the neuron cores and storage devices is essential and requires massive changes in the configuration.

Further, a conventional neural network performing three parallel operations, for example, is configured such as shown in FIG. 1B. This neural network comprises neuron cores 1-0, 1-1, and 1-2 arranged in a cascade connection. At the neuron cores 1-0, 1-1, and 1-2, the weight values w0 to w2 are supplied from the storage devices 2-0, 2-1, and 2-2 under the direction of the main control unit 3.

In this neural network, the input data x0 is supplied from the prior stage device 00 to the data input terminal X of the neuron core 1-0. At the neuron core 1-0, an operation is performed using the input data x0 and the weight value w0 whereby the output data y0 is output from the data output terminal Y after the operation time "t". This output data y0 is used as an intermediate result value x1 (output data y0) for the next stage neuron core 1-1. And for the neuron core 1-1, the intermediate result value x1 (output data y0) supplied to the data input terminal X is the input data x1.

At the neuron core 1-1, an operation is performed using the input data x1 and the weight value w1 whereby the output data y1 is output from the data output terminal Y after the operation time "t". This output data y1 is used as the intermediate result value x2 (output data y1) for the next stage neuron core 1-2. And for the neuron core 1-2, the intermediate result value x2 (output data y1) supplied to the data input terminal X is the input data x2.

At the neuron core 1-2, an operation is performed using the input data x2 and the weight value w2 whereby the output data y2 is output from the data output terminal Y after the operation time "t". This output data y2 is the result value x3 of this neural network. And this result value x3, which is output from the neural network performing three serial operations, is provided to the next stage neural network comprising the later stage device 03. According to this constitution, to adjust the number of serial processes, an adjustment of the number of neuron cores and storage devices would be essential and require massive changes in the configuration. Further, if monitoring the intermediate result values, the number of signals becomes huge.

NPL 1 discloses a three-stage neural network forming a basic unit of deep learning. In this neural network, if focusing on a digital or analog operation such as a multiply accumulator, a complete digital type, mixed analog-digital type, and complete analog type have been proposed. The merits and demerits of these are being studied.

PTL 1 discloses a neural network provided with a synapse operation circuit performing a synapse operation on an input value and synapse coefficient, and configured to supply a synapse coefficient to this operation circuit from a synapse coefficient memory. The invention described in PTL 1 compares a learning coefficient output from a differential nonlinear circuit 6 with "0" at a first comparator and compares a lea ling coefficient output from a learning error operation circuit with "0" at a second comparator. When either of the learning coefficient or learning error equals "0" and a signal is output from the first comparator or second comparator, the control circuit stops the operation of a synapse coefficient updating circuit and eliminates wasteful operations for updating the synapse coefficients. Thereby, the amount of operations is cut by that amount and the number of times the synapse coefficient memory has to be accessed is slashed, accordingly.

PTL 2 discloses a neural network system having an input layer, hidden layers, and an output layer. The neurons forming the layers are provided with registers for time-division input usage that latches input signals, and with a multiplication value storage means for storing multiplication values used for predetermined operations as multiplication values expressed as a power of −2. Further, the neurons are provided with a control means for controlling the registers and a storage means, using the registers and successively fetching input signals used for the operations by time-division, and making the storage means sequentially output multiplication values used for the operations in accordance with operation timings. Furthermore, the neurons include multiply-accumulating means using sequentially fetched input signals and multiplication values successively output from the storage means for successively performing operations as multiply-accumulate operations. The neural network system successively performs operations inside the neurons as multiply-accumulate operations by sequentially fetching input signals by time-division.

CITATIONS LIST

Patent Literature

PTL 1. Japanese Unexamined Patent Publication No. H9-101944
PTL 2. Japanese Unexamined Patent Publication No. H6-259585

Nonpatent Literature

NPL 1. Marukame T., Ueyoshi K., Asai T., Motomura M., Schmid A., Suzuki M., Higashi Y., and Mitani Y., "Error Tolerance Analysis of Deep Learning Hardware Using a Restricted Boltzmann Machine Toward Low-Power Memory Implementation", IEEE TRANSACTIONS ON CIRCUITS AND SYSTEMS II: EXPRESS BRIEFS, VOL. 64, NO. 4, APRIL-2017, P462-466

SUMMARY OF THE INVENTION

In an embodiment of the present invention, a neural network is provided with a neural network processor not requiring a massive change of configuration when changing the number of stages (number of layers) of the neural network.

BRIEF DESCRIPTION OF THE DRAWINGS

FIG. 3H is a view showing in tabular format the process from when weight values are set at registers until the third operation is performed in the neural network according to the second embodiment of the present invention.
FIG. 4B is a view showing in tabular format the process from when weight values are set at registers to when results of the third operation being performed are stored in the registers in the neural network according to the third embodiment of the present invention.
FIG. 5B is a view showing in tabular format the process from when weight values are set at registers to when results of the third operation being performed are stored in the registers in the neural network according to the fourth embodiment of the present invention.
FIG. 6B is a view showing in tabular format the process from when weight values are set at registers to when results of the third operation being performed are stored in the registers in the neural network according to the fifth embodiment of the present invention.

DESCRIPTION OF THE PREFERRED EMBODIMENTS

Below, referring to the attached drawings, embodiments of the present invention will be explained. In the figures, the same component elements are assigned the same reference notations and overlapping explanations are omitted.

Figure 1A:
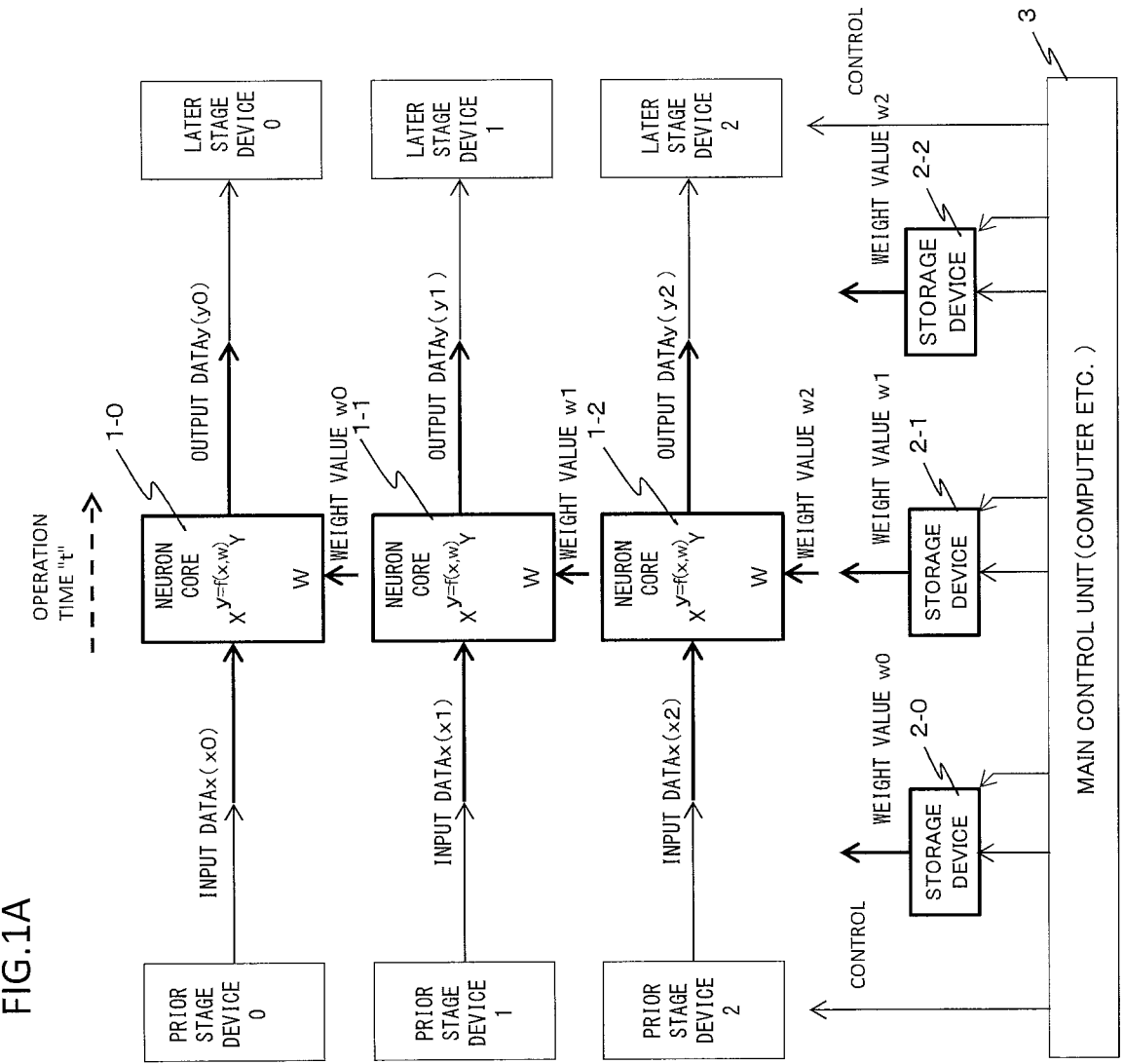
FIG. 1A is a view of the configuration of a conventional neural network performing three parallel operations.
Figure 1B:
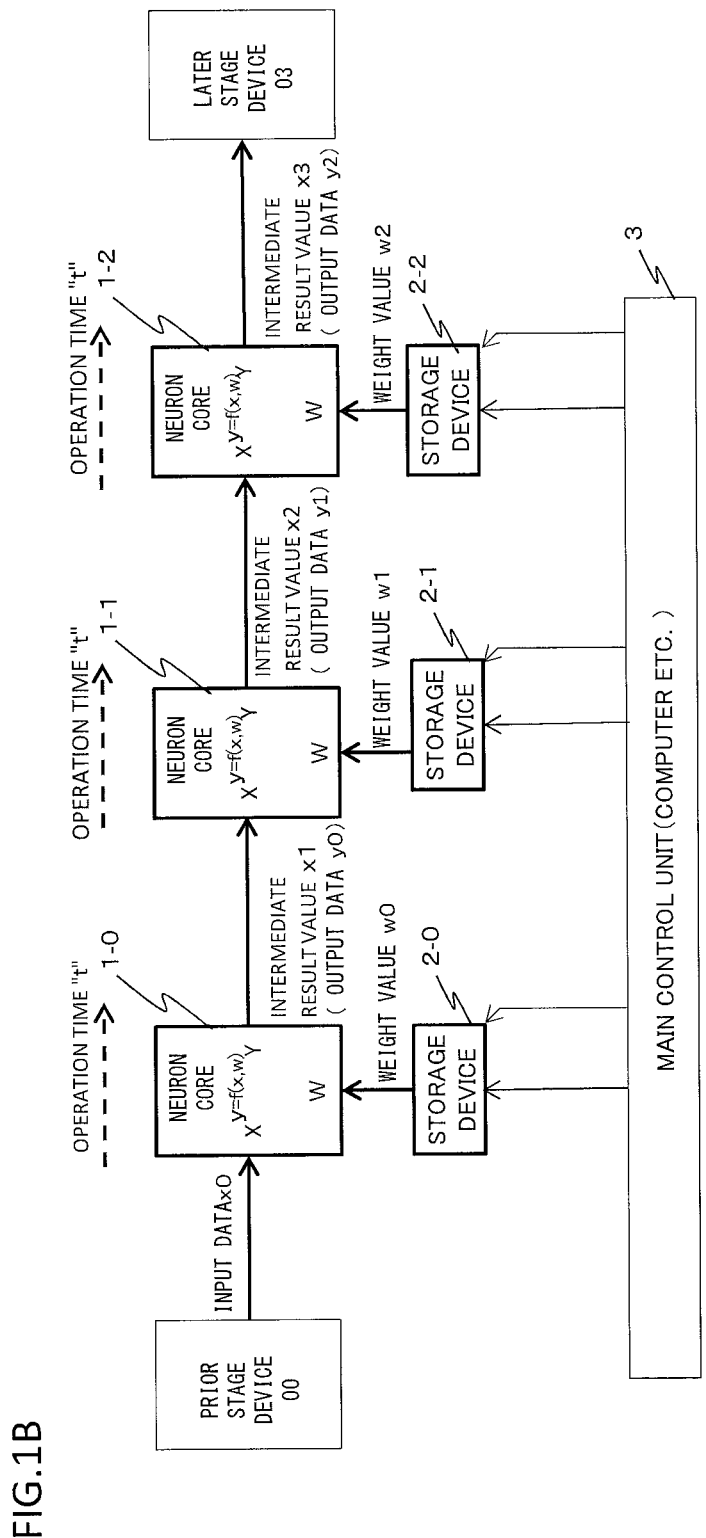
FIG. 1B is a view of the configuration of the other conventional neural network performing three parallel operations.
Figure 2:
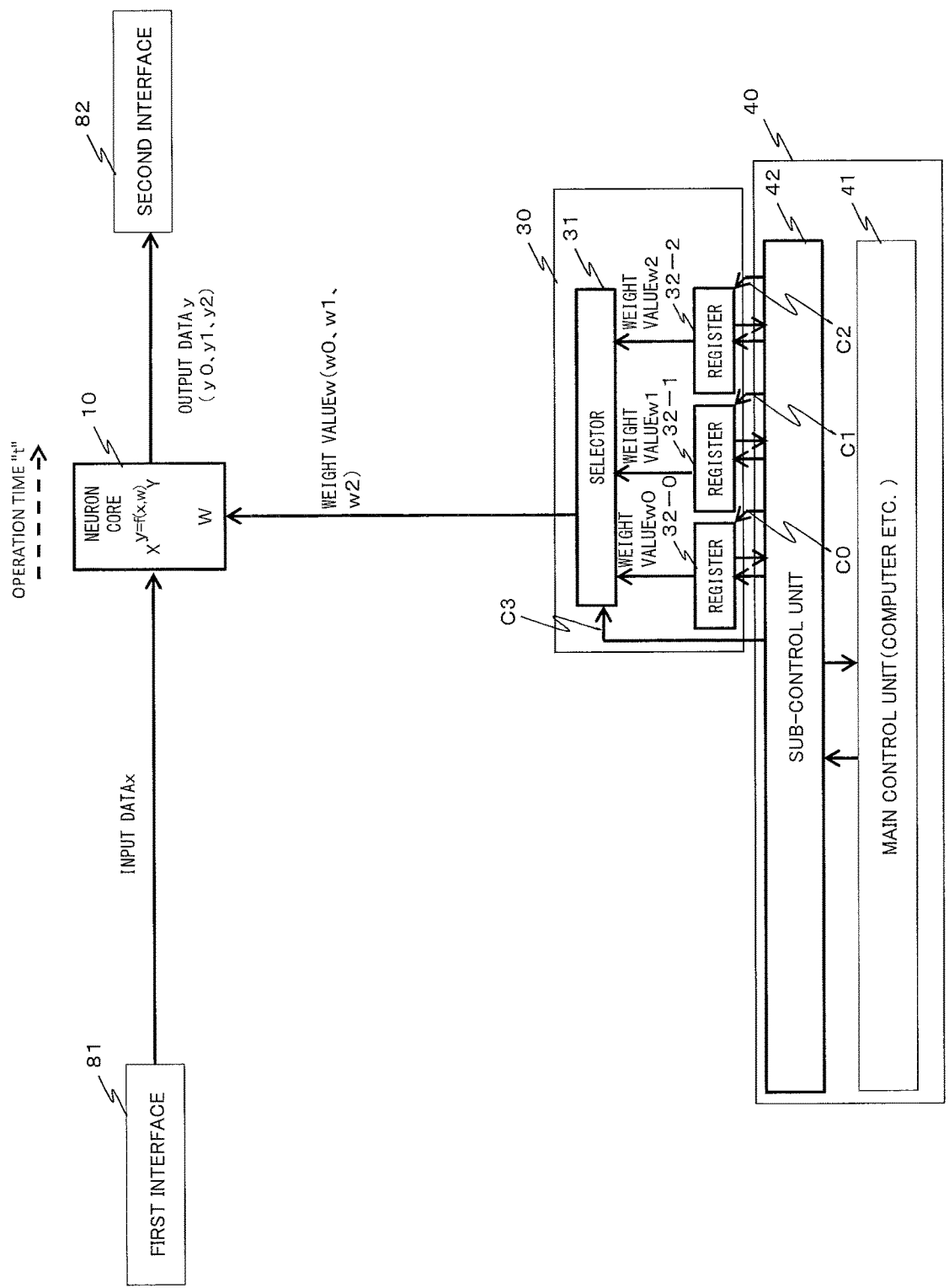
FIG. 2 is a view of the configuration of a neural network according to a first embodiment of the present invention.

In the following embodiments, the components other than the main control unit 41 form the processor of the neural network. Further, the neural network is provided with at least one neuron core 10 and can employ a configuration providing a weight-value-supply control unit 30 and a control-processor unit 40 required for this configuration. Furthermore, the neural network is provided with at least one neuron core 10 and can employ a configuration providing a weight-value-supply control unit 30, data-hold-supply control unit 50, and control-processor unit 40 required for this configuration. FIG. 2 is a view of the configuration of the neural network according to the first embodiment, which shows a three-parallel operation neural network.

In this embodiment, a single neuron core 10 is provided. The neuron core 10 has a data input terminal X, data output terminal Y, and weight value input terminal W and performs an analog multiply-accumulate operation based on the input data "x" arriving from the data input terminal X and the input data "w" arriving from the weight value input terminal W. This weight value "w" is either of the later explained weight values w0, w1, and w2. The data input terminal X is connected to a first interface 81. The input data "x" arrives through the first interface 81. The neuron core 10 performs an analog multiply-accumulate operation and outputs the results of the operation from the data output terminal Y as the output data "y". This multiply-accumulate operation is expressed by y=f(x,w) where "f" represents a function. Further, the output data "y" is sent through the second interface 82.

At the weight value input terminal W, the selector 31 and the registers 32-0, 32-1, and 32-2 of the weight-value-supply control unit 30 are connected. Weight values are supplied from the weight-value-supply control unit 30. That is, the weight-value-supply control unit 30 is provided with a plurality of registers 32-0, 32-1, and 32-2 holding the weight values w0, w1, and w2 and with a selector 31 for selecting any of the plurality of registers 32-0, 32-1, and 32-2 and opening and closing the path for supplying a respective weight value to the weight value input terminal W as the weight value "w".

At the weight-value-supply control unit 30, the control-processor unit 40 is connected. The control-processor unit 40 comprises a sub-control unit 42 and a main control unit 41. The main control unit 41 performs overall control of the neural network and can include a computer, etc. Further, the sub-control unit 42, which is an interface directly controlling the neuron core 10 and the weight-value-supply control unit 30 based on instructions from the main control unit 41, has the functions of a controller, sequencer, and command register. Therefore, if instructions and required data for a neural network performing several serial operations, several parallel operations, and mixed operations of several serial operations and several parallel operations are supplied from the main control unit 41 to the sub-control unit 42, the sub-control unit 42 performs a processing operation to obtain the final processing result without the intervention of the main control unit 41 in the time period when processing is performed by this neural network. When setting the weight values w0, w1, and w2 at the registers 32-0, 32-1, and 32-2, the sub-control unit 42 directs the transmission of control signals through the control signal lines C0, C1, and C2 to the registers 32-0, 32-1, and 32-2 to render them states for receiving data (weight values). Further, the sub-control unit 42 sends a control signal through the control signal line C3 to the selector 31 to select the weight value from any one of the registers 32-0, 32-1, and 32-2 and deliver it to the weight value input terminal W of the neuron core 10.

The above-configured neural network sets the required weight values w0, w1, and w2 at the registers 32-0, 32-1, and 32-2 under the control of the main control unit 41 before the input data "x" arrives at the data input terminal X of the neuron core 10 through the first interface 81. If the input data "x" arrives at the data input terminal X of the neuron core 10 at the timing of an analog multiply-accumulate operation of the neuron core 10, the control-processor unit 40 directs an operation supplying the weight value "w" (w0, w1, or w2) from the weight-value-supply control unit 30 in synchronization with that timing.

That is, at the timing of the first analog multiply-accumulate operation the selector 31 is controlled so that the weight value w0 is sent from the register 32-0, at the timing of the second analog multiply-accumulate operation the selector 31 is controlled so that the weight value w1 is sent from the register 32-1, at the timing of the third analog multiply-accumulate operation the selector 31 is controlled so that the weight value w2 is sent from the register 32-2.

The control-processor unit 40, together with the above control, processes the data output from the data output terminal Y for every analog multiply-accumulate operation performed by the neuron core as serial data and/or as parallel data. In the present embodiment, to process three paths of parallel output data, the output data y0 obtained by the above first operation, the output data y1 obtained by the above second operation, and the output data y2 obtained by the third operation are fetched as output data "y" after a certain amount of time has elapsed after the respective operations. That is, processing is performed for obtaining three output data y0, y1, and y2 by time-division. These are sent out, for example, to three paths (not shown) connected to the second interface 82 in a time-division order. According to the present embodiment, time is required before obtaining the three parallel output data y0, y1, and y2, but it is possible to streamline the configuration without having to use three neuron cores 10.

Figure 3A:
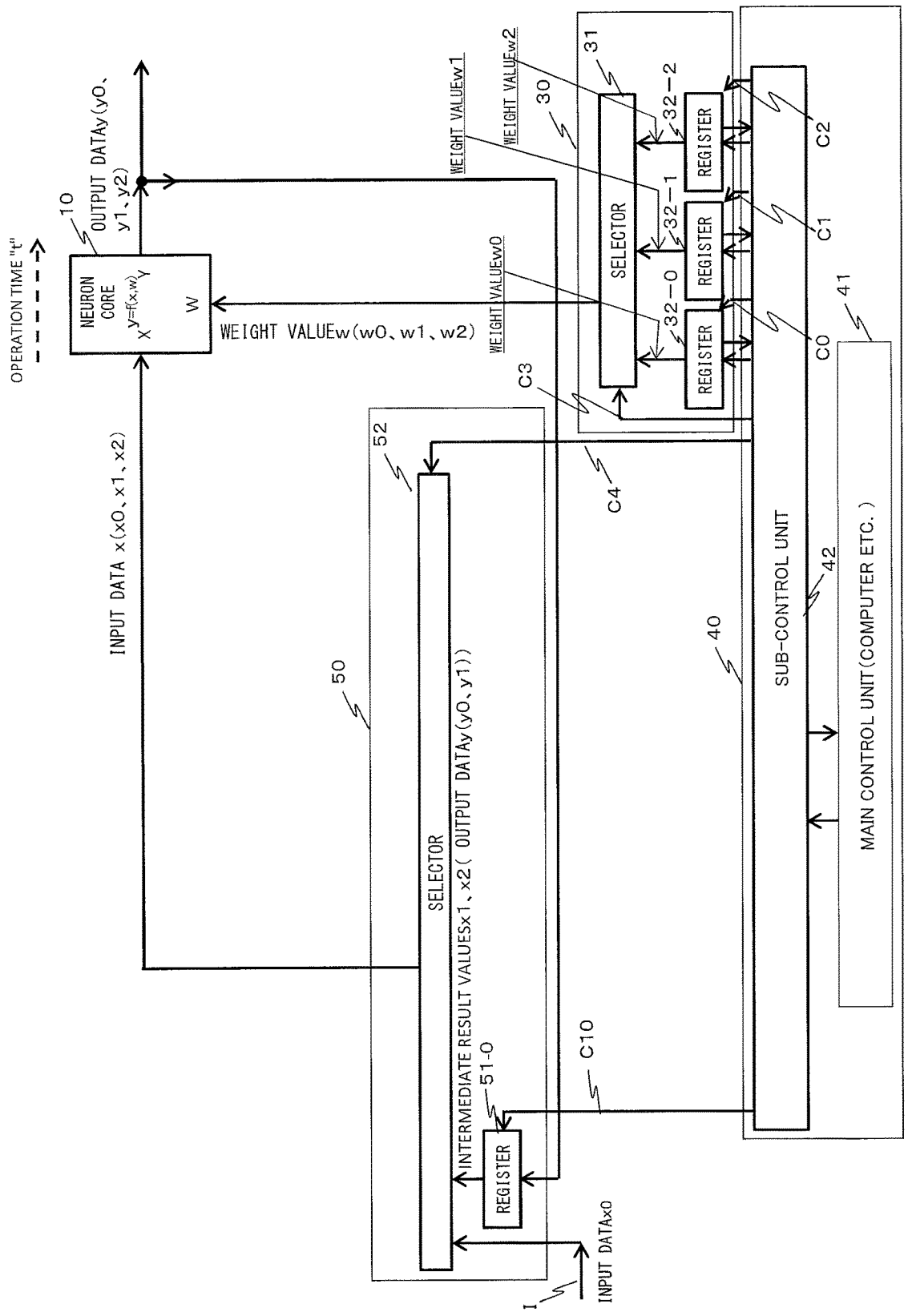
FIG. 3A is a view of the configuration of a neural network according to a second embodiment of the present invention.

Next, a neural network according to a second embodiment realized by three-serial connections (cascade connection) will be explained. The present embodiment, as shown in FIG. 3A, is configured as the first embodiment further provided with a register (storage device) 51-0 and a selector 52 as the data-hold-supply control unit 50 for supplying data from the register 51-0 to the data input terminal X of the neuron core 10. This selector 52 is a component for selecting at least one register holding data and opening and closing the path for transmitting the data held at the register to the data input terminal X. In the present embodiment, as well, the control-processor unit 40, together with the above control, processes the output data "y" output from the data output terminal Y for every analog multiply-accumulate operation performed by the neuron core as serial data and/or as parallel data. In the present embodiment, to process data as serial data, for example, the final result value is sent, for example, to the next stage without obtaining the output data of the multiply-accumulate operation using the weight values w0, w1, and w2 held at the registers 32-0, 32-1, and 32-2.

The register 51-0 obtains and holds the output data "y" (y0, y1) from the data output terminal Y of the neuron core 10. The timing of holding the output data "y" (y0, y1) is controlled by the sub-control unit 42 sending a control signal for rendering the register in a state for receiving the output data through the control signal line C10 under the control of the main control unit 41. Further, the input data x0 arriving from the prior stage device through a line I is input through the selector 52 to the data input terminal X of the neuron core 10 as the initial input data "x". The selector 52 is controlled by the sub-control unit 42 through the control signal line C4 under the control of the main control unit 41. Due to the control signal of the control signal line C4, it is possible to output the input data x0 arriving from the prior stage device through the line I or the intermediate result values x1, x2 held at the register 51-0 by selection of the selector 52. That is, due to the control-processor unit 40, the timing of holding data at the data-hold-supply control unit 50 and the timing of supply of the held data to the data input terminal X are controlled. In the present embodiment, the sub-control unit 42 directly controls the neuron core 10, the weight-value-supply control unit 30, and the data-hold-supply control unit 50 based on instructions from the main control unit 41. Further, under the direction of the main control unit 41, weight values can be set at the weight-value-supply control unit 30 and data can be set at the data-hold-supply control unit 50.

Figure 3B:
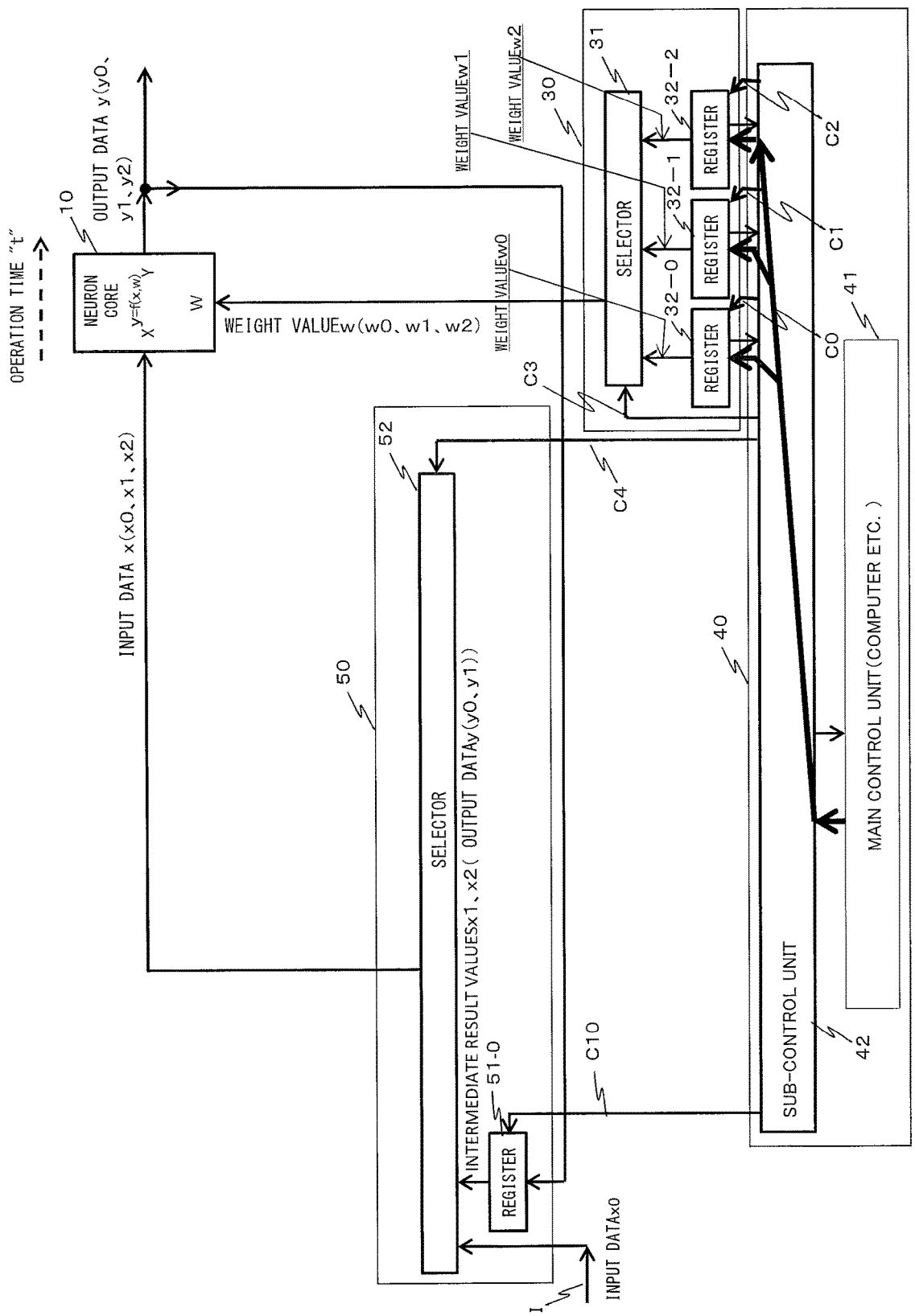
FIG. 3B is a view showing the process until weight values are stored in registers in the neural network according to the second embodiment of the present invention.

In the thus-configured neural network, before operation as a neural network, as shown by the bold arrows of FIG. 3B, the weight values w0, w1, and w2 that are set at the registers 32-0, 32-1, and 32-2 are provided by the main control unit 41. The values are set at the registers 32-0, 32-1, and 32-2 by the sub-control unit 42 under the control of the main control unit 41.

Figure 3C:
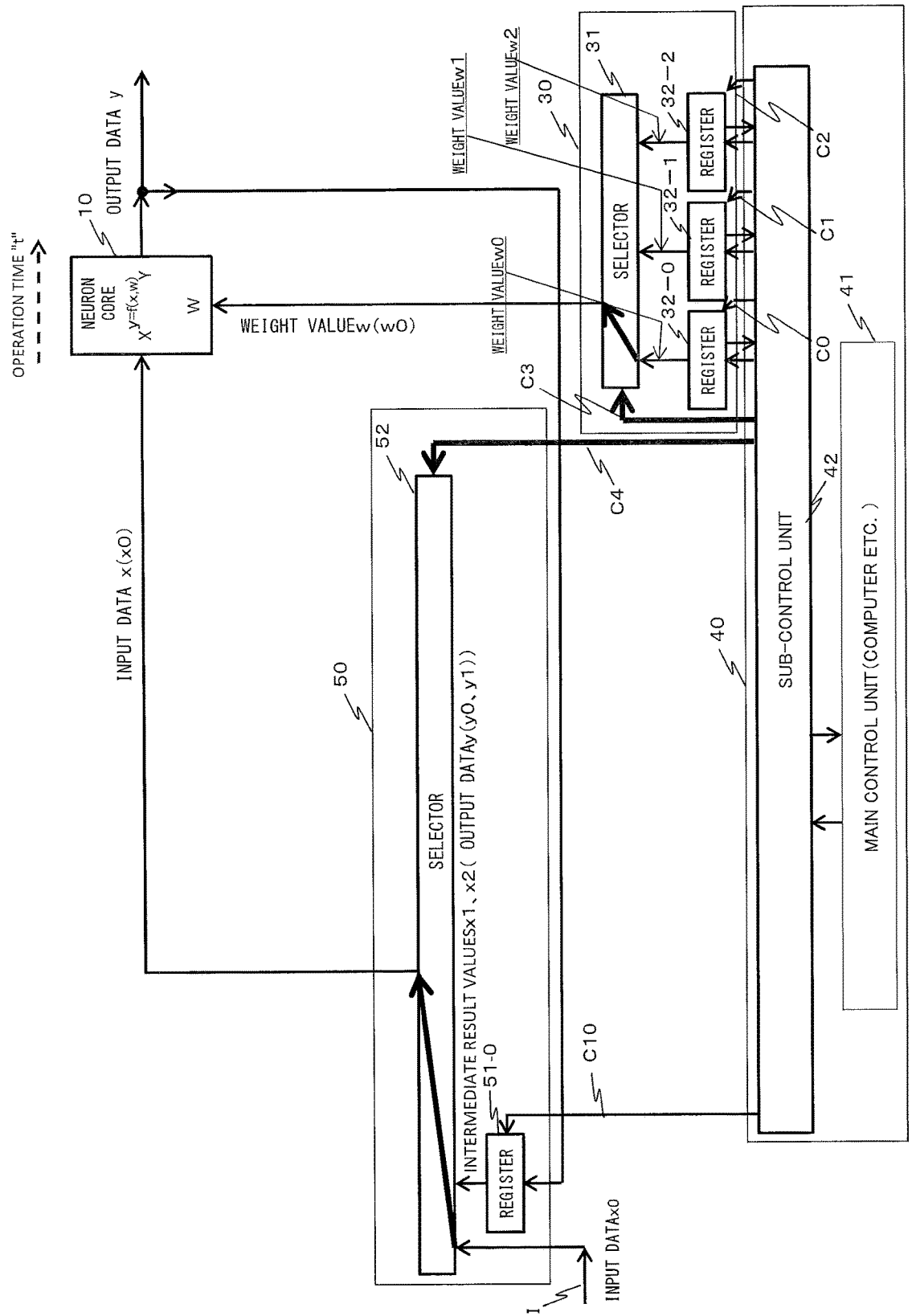
FIG. 3C is a view showing the process until a first operation is performed in a neural network according to a second embodiment of the present invention.

Next, the weight value w0 is supplied from the register 32-0 and the input data x0 arriving from the prior stage device through the line I is supplied as the initial input data "x" to the data input terminal X of the neuron core 10 for control as shown by the bold arrows of FIG. 3C. That is, the selector 31 is controlled by the sub-control unit 42 so that the register 32-0 is selected and the weight value w0 is supplied to the weight value input terminal W of the neuron core 10. Together with this, the selector 52 is controlled by the sub-control unit 42 so that the input data x0 arriving from the prior stage device through the line I is selected and the input data x0 is supplied to the data input terminal X of the neuron core 10.

At the neuron core 10, from the operation time "t", an analog multiply-accumulate operation is performed based on the data x0 arriving from the data input terminal X and the weight value w0 arriving from the weight value input terminal W. After the elapse of the time "t", the output data y0 is output as the output data "y" from the data output terminal Y of the neuron core 10.

Figure 3D:
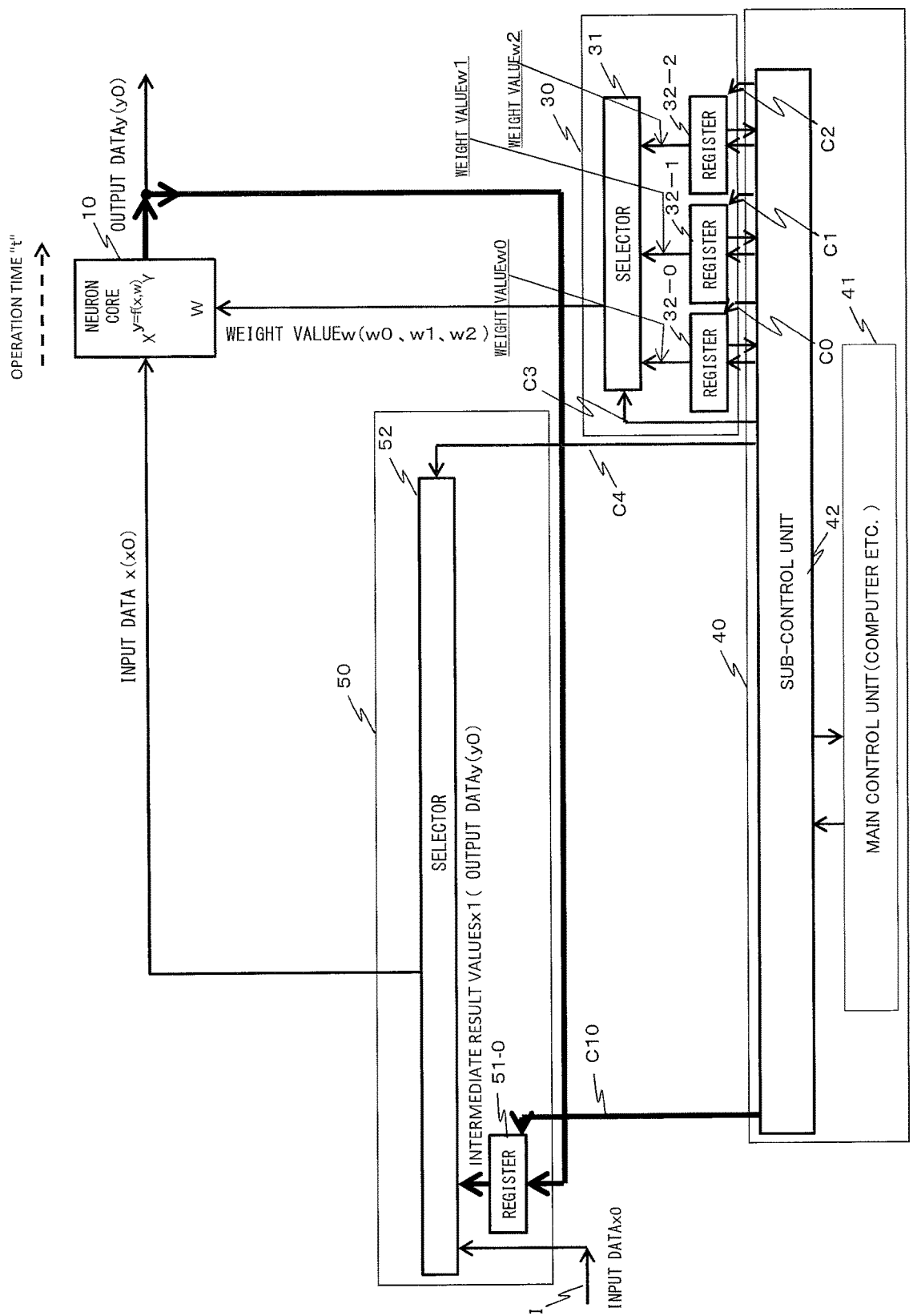
FIG. 3D is a view showing the process until results of the first operation are stored in registers in the neural network according to the second embodiment of the present invention.

Next, as shown by the bold arrows in FIG. 3D, the output data y0 output from the data output terminal Y is held at the register 51-0 as the intermediate result value x1 (output data "y" (y0)) under the direction of the sub-control unit 42.

Figure 3E:
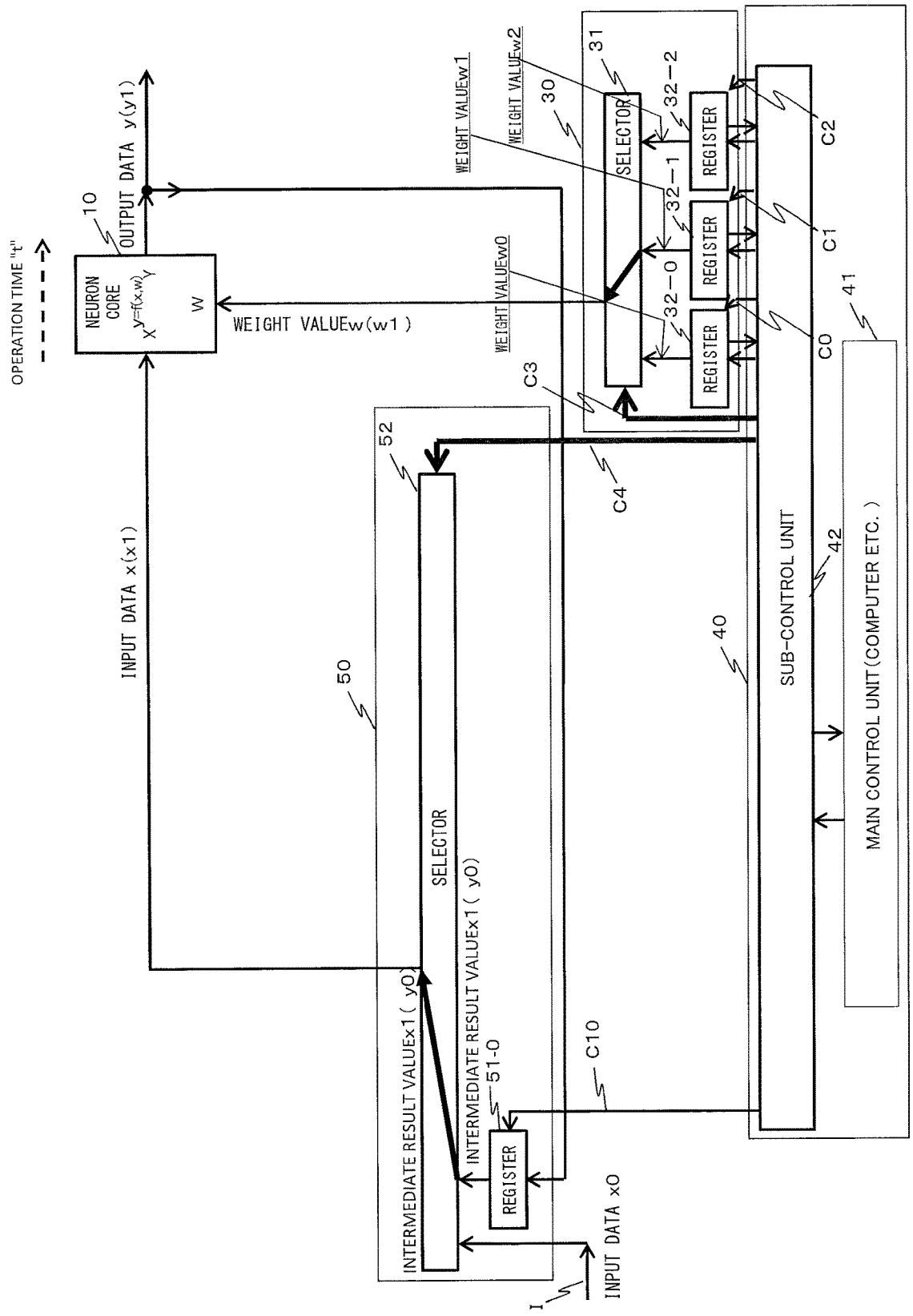
FIG. 3E is a view showing the process until a second operation is performed in a neural network according to the second embodiment of the present invention.

Next, the weight value w1 is supplied from the register 32-1 and the intermediate result value x1 held at the register 51-0 is supplied to the neuron core 10 by the path shown by the bold arrows in FIG. 3E. That is, the selector 31 is controlled by the sub-control unit 42 whereby the register 32-1 is selected and the weight value w1 is supplied to the weight value input terminal W of the neuron core 10. Together with this, the selector 52 is controlled by the sub-control unit 42 whereby the intermediate result value x1 held at the register 51-0 is selected and is supplied as the input data x1 to the data input terminal X of the neuron core 10.

At the neuron core 10, from the operation time "t", an analog multiply-accumulate operation is performed based on the input data x1 arriving from the data input terminal X and the weight value w1 arriving from the weight value input terminal W. After the elapse of the time "t", the output data y1 is output from the data output terminal Y of the neuron core 10.

Figure 3F:
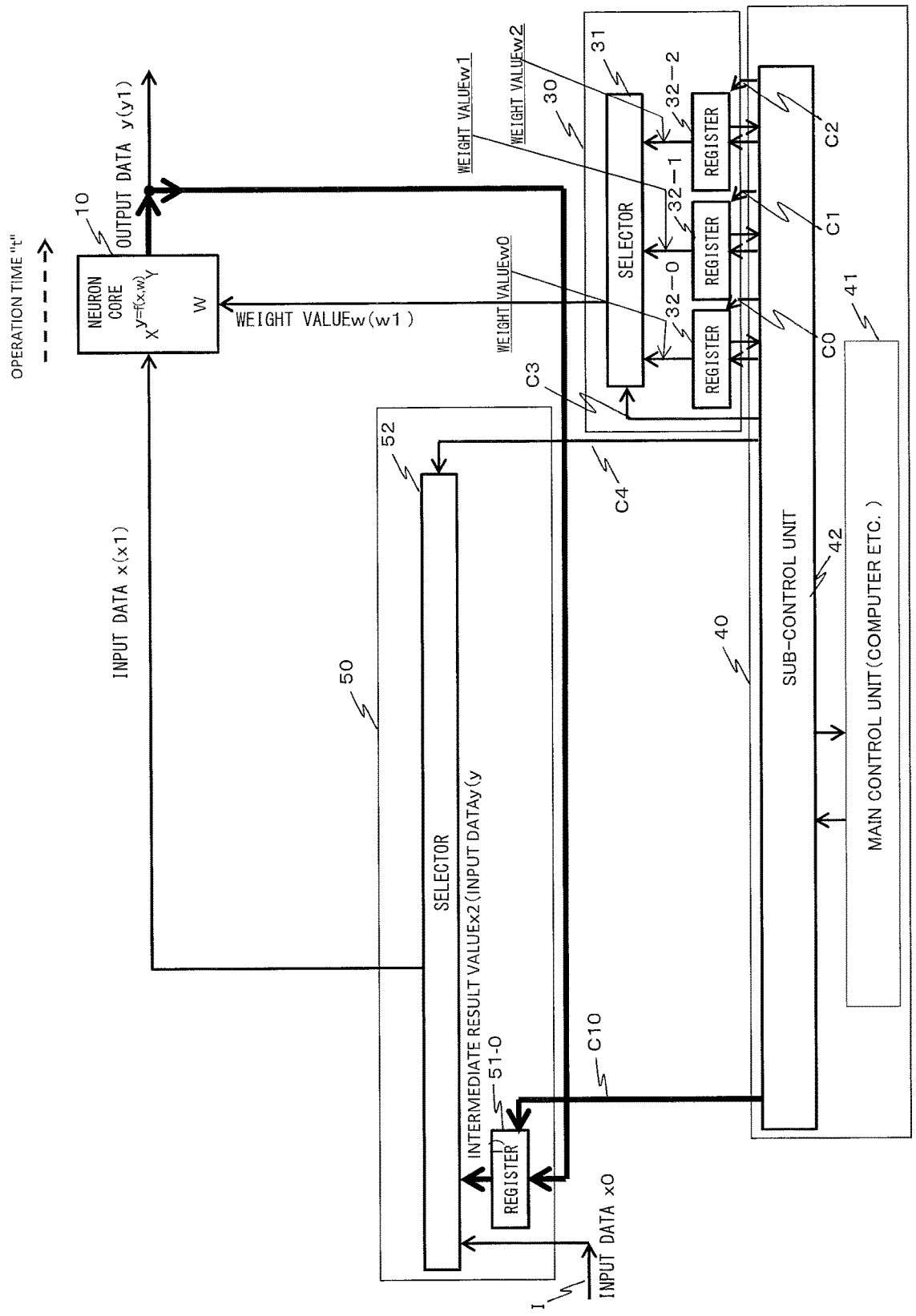
FIG. 3F is a view showing the process until results of the second operation are stored in registers in the neural network according to the second embodiment of the present invention.

Next, as shown in FIG. 3F, the output data y1 is output as the output data "y" from the data output terminal Y of the neuron core 10 and is controlled by the sub-control unit 42 to be held at the register 51-0 whereby the output data y1 is held at the register 51-0 as the intermediate result value x2.

Figure 3G:
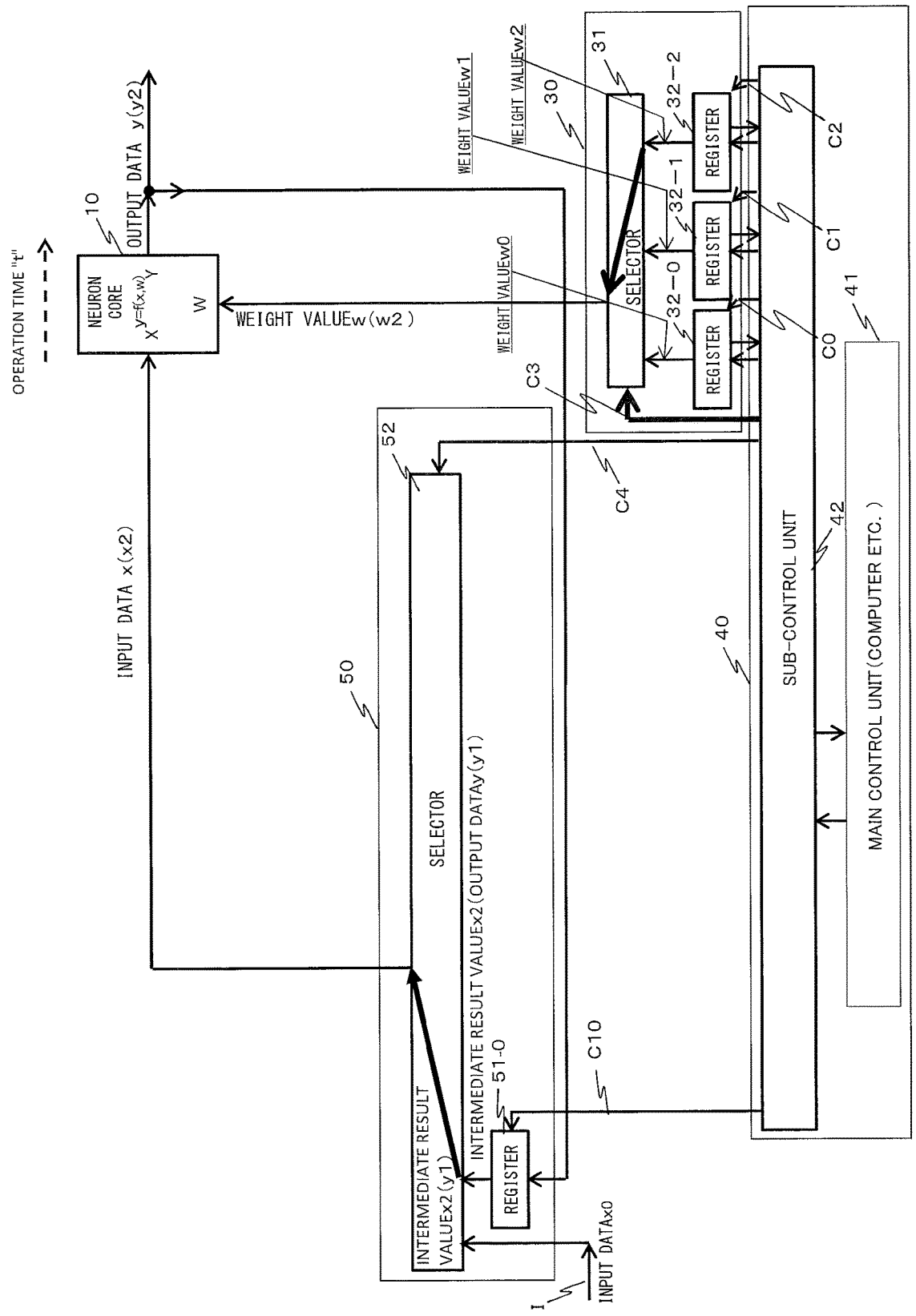
FIG. 3G is a view showing the process until a third operation is performed in the neural network according to the second embodiment of the present invention.

Next, as shown by the bold arrows of FIG. 3G, the weight value w2 is supplied from the register 32-2 and the held intermediate result value x2 is supplied as the input data "x" (x2) to the data input terminal X of the neuron core 10. That is, the selector 31 is controlled by the sub-control unit 42 so that the register 32-2 is selected and the weight value w2 is supplied to the weight value input terminal W of the neuron core 10. Together with this, the selector 52 is controlled by the sub-control unit 42 so that the intermediate result value x2 held at the register 51-0 is selected and is supplied as input data x2 to the data input terminal X of the neuron core 10.

At the neuron core 10, from the operation time "t", an analog multiply-accumulate operation is performed based on the data x2 arriving from the data input terminal X and the weight value w2 arriving from the weight value input terminal W. After the elapse of the time "t", the output data y2 is output from the data output terminal Y of the neuron core 10.

A summary of the operations explained above are shown in FIGS. 3B to 3G, and the results are shown in tabular form in FIG. 3H. That is, the operation described in the "advance" section of FIG. 3H is shown in FIG. 3B, the operations described in the sections of steps S1 and S2 are shown in FIG. 3C, and the operation described in the section of step S3 is shown in FIG. 3D. Furthermore, the operations described in the sections of steps S4 and S5 are shown in FIG. 3E, while the operation described in the section of step S6 is shown in FIG. 3F. Furthermore, the operations described in steps S7 and S8 are shown in FIG. 3G.

Figure 4A:
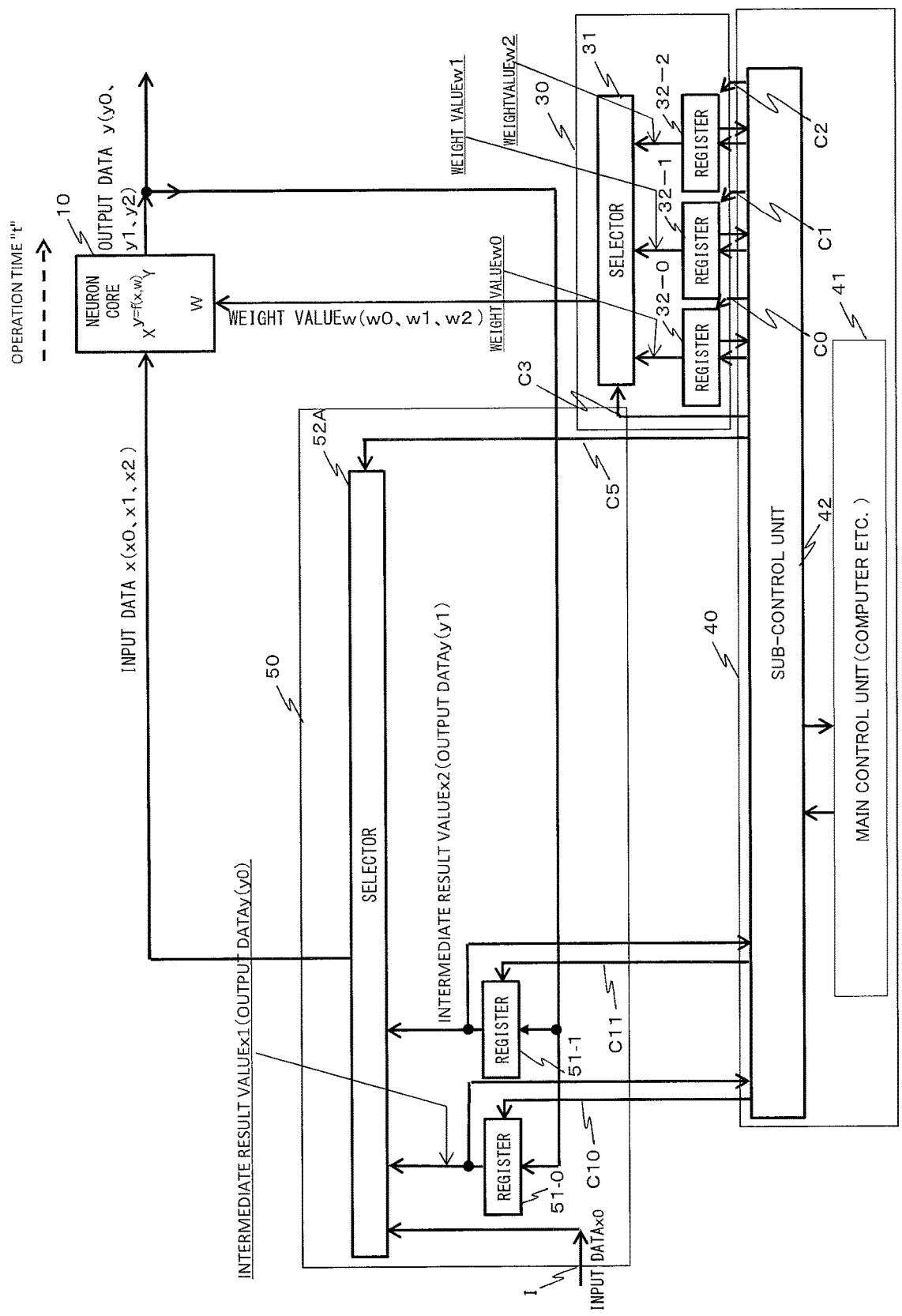
FIG. 4A is a view of the configuration of a neural network according to a third embodiment of the present invention.

Next, a neural network according to a third embodiment realized by a three-serial connection (cascade connection) will be explained. The present embodiment, as shown in FIG. 4A, is configured as the second embodiment where the data-hold-supply control unit 50 is further provided with a new register (storage device) 51-1 in addition to the existing register (storage device) 51-0, and data can be supplied from the new register 51-1 to the data input terminal X of the neuron core 10. In the present embodiment, two registers 51-0 and 51-1 are provided. The two registers 51-0 and 51-1 are controlled by sending to these two registers through the control signal lines C10 and C11 control signals having the same functions as the functions already explained in FIG. 3A (rendering the registers in states for receiving the output data). Furthermore, in the present embodiment, through the sub-control unit 42 the main control unit 41 is enabled to read the data held at these registers 51-0 and 51-1 (intermediate result values) for assisting in the improvement of the debugging performance of the neural network or obtaining an overall picture of the operation. In this way, the neural network of the present embodiment can refer to the data set at the data-hold-supply control unit 50 from the main control unit 41. Further, all of the embodiments can refer to the weight values set at the weight-value-supply control unit 30 from the main control unit 41.

The operation of the neural network according to the present embodiment basically is the same as the operation of the neural network according to the second embodiment. It differs on the point that there are two registers holding intermediate result values and the contents of these two registers can be read by the main control unit 41. Further, the selector 52A is controlled by the sub-control unit 42 through the control signal line C5 under the control of the main control unit 41. It is possible to send a control signal through the control signal line C5 to direct the selector 52A whether to output the input data x0 arriving from the prior stage device through the line I, the intermediate result value x1 held at the register 51-0, or the intermediate result value x2 held at the register 51-1. Therefore, the operation of the neural network according to the present embodiment is shown in tabular form in FIG. 4B, similar to FIG. 3H describing the operation of the neural network according to the second embodiment.

What should be noted in FIG. 4B is that if the intermediate result value x1 (y0) is obtained at step S12, the intermediate result value x1 (y0) is stored in the register 51-0 (step S13).

Further, at the next step S14, the register 51-0 is selected and the held intermediate result value x1 (y0) is supplied to the data input terminal X of the neuron core 10.

Next, what should be noted in FIG. 4B is that if the intermediate result value x2 (y1) is obtained at step S15, the intermediate result value x2 (y1) is stored in the register 51-1 (step S16). Further, at the next step S17, the register 51-1 is selected and the held intermediate result value x2 (y1) is supplied to the data input terminal X of the neuron core 10 as the input data x2.

At the above step S13 and on, the intermediate result value x1 (y0) held at the register 51-0 is read out by the main control unit 41 through the sub-control unit 42, which is helpful for improving the debugging performance of the neural network or obtaining a general picture of the operation. Further, at the above step S16 and so on, the intermediate result value x2 (y1) held at the register 51-1 is read out by the main control unit 41 through the sub-control unit 42, so it is possible to assist in the improvement of the debugging performance of the neural network or obtain a general picture of the operation.

Figure 5A:
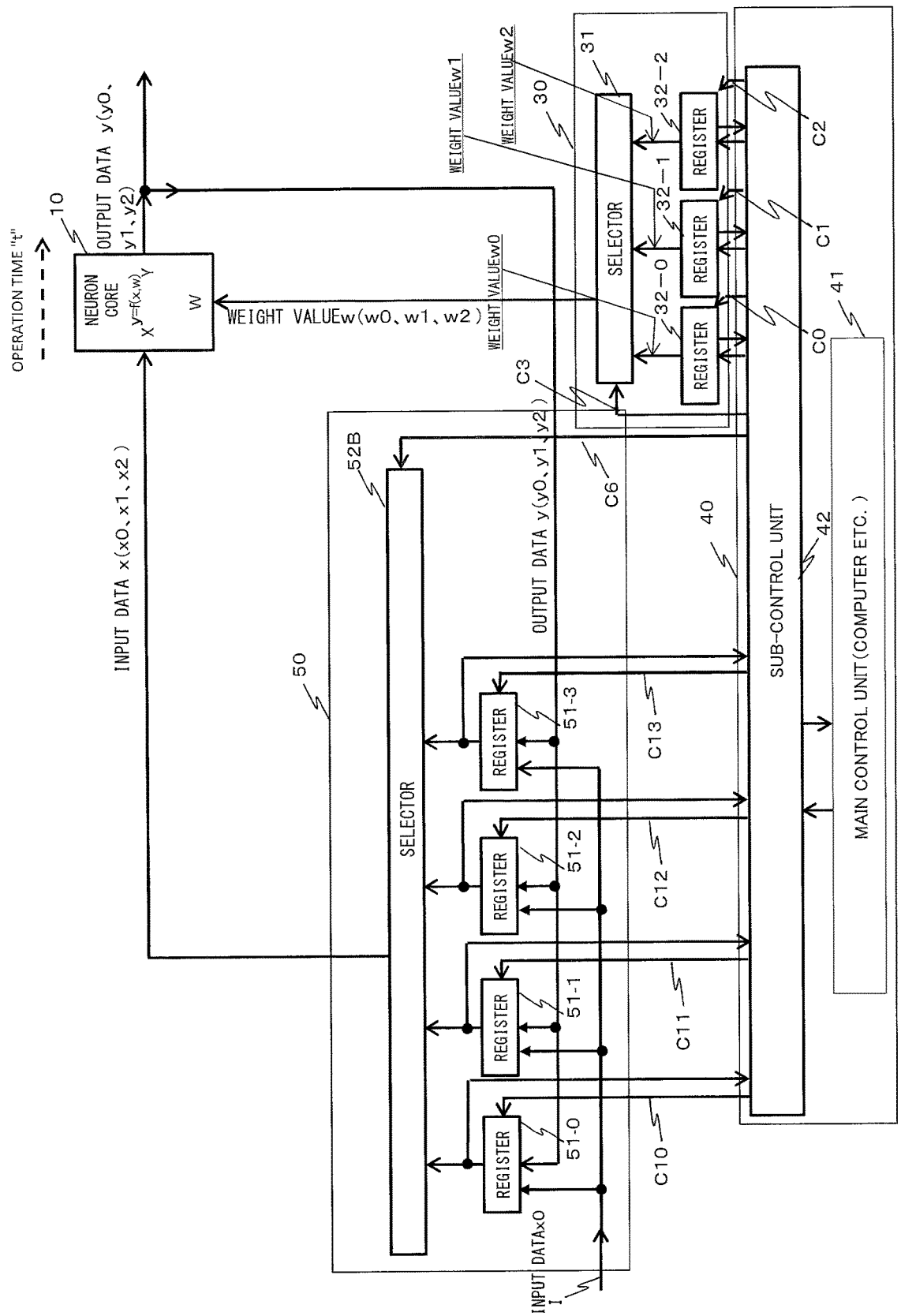
FIG. 5A is a view of the configuration of a neural network according to a fourth embodiment of the present invention.
Figure 6A:
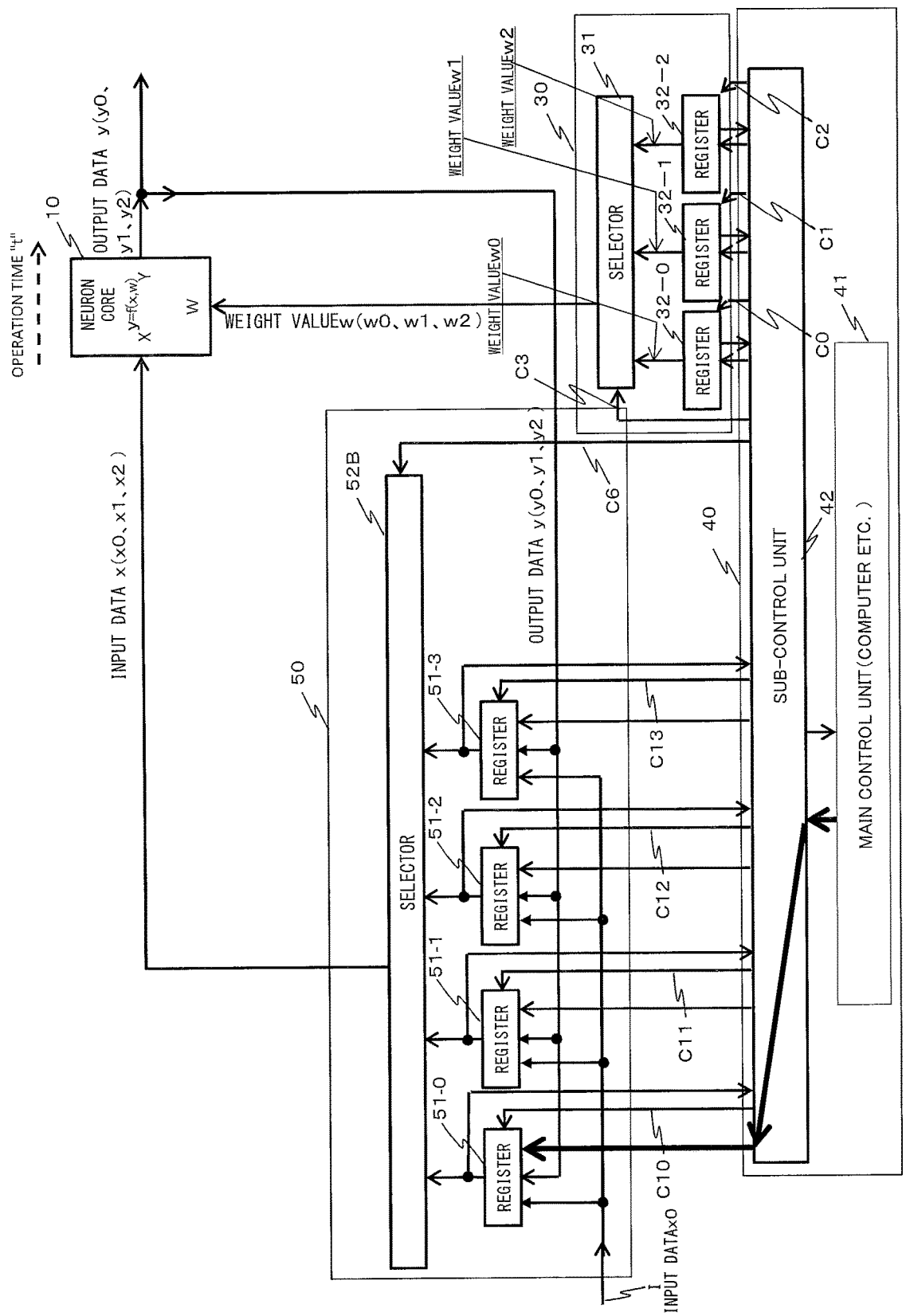
FIG. 6A is a view of the configuration of a neural network according to a fifth embodiment of the present invention.
Figure 7:
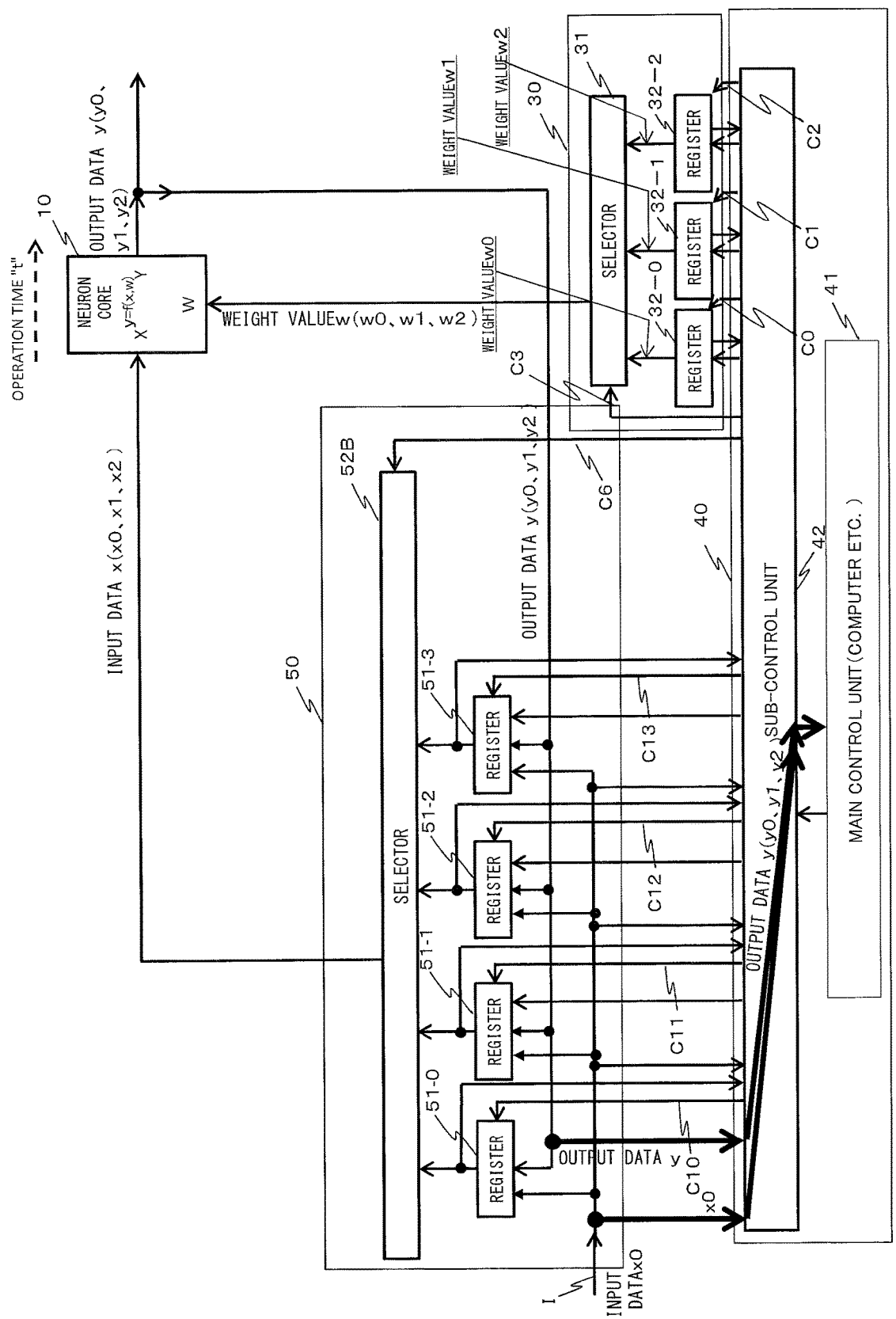
FIG. 7 is a view of the configuration of a neural network according to a sixth embodiment of the present invention.

Next, the neural network according to a fourth embodiment realized by a three-serial connection (cascade connection) will be explained. The present embodiment, as shown in FIG. 5A, is configured as the third embodiment wherein the data-hold-supply control unit 50 is provided with new registers (storage devices) 51-2 and 51-3 in addition to the registers (storage devices) 51-0 and 51-1, and any of these registers 51-0, 51-1, 51-2, and 51-3 can be set with the input data x0 of the initial period of time arriving from the prior stage device through the line I as the input data "x". Furthermore, any of the registers 51-0, 51-1, 51-2, and 51-3 can be supplied with and hold the output data "y" output from the data output terminal Y of the neuron core 10, and the output data "y" held in any of registers 51-0, 51-1, 51-2, and 51-3 can be monitored. In the embodiment of FIG. 5A, FIG. 6A, and FIG. 7, four registers 51-0, 51-1, 51-2, and 51-3 are provided. These four registers are controlled by sending to them through the control signal lines C10, C11, C12, and C13 control signals having the same functions as the functions already explained in FIG. 3A (rendering them in states for receiving the output data). Further, the selector 52B is controlled by the sub-control unit 42 through the control signal line C6 under the control of the main control unit 41. Due to the control signal of the control signal line C6, it is possible to direct the selector 52B to select and output as the input data x0 arriving from the prior stage device through the line I either the input data x0 which had been held at the register 51-0, the intermediate result value x1 which had been held at the register 51-1, or the intermediate result value x2 which had been held at the register 51-2. Using the selector 52B, it is also possible to select and output the data set at the register 51-3, but in the embodiment of FIG. 5A, FIG. 6A, FIG. 7, such usage is not employed.

The operation of the neural network according to the present embodiment will be explained using FIG. 5B. In the present embodiment, as described in FIG. 5B, at step S20 before processing by the neuron core 10 is started, the register 51-0 is, for example, made to hold the input data x0 arriving from the prior stage through the line I, while at step S21, the selector 52B is controlled to select the register 51-0 and the selector 31 is controlled to select the weight value w0 of the register 32-0 to start the processing. Next, at step S22, the neuron core 10 is used to obtain the intermediate result value as the output data y0 by a multiply-accumulate operation. At step S23, the register 51-1 is directed to hold the output data y0 as the intermediate result value x1. At this point in time, the input data x0 that was used for the processing is held in the register 51-0 and the output data y0 that was obtained by the multiply-accumulate operation at the neuron core 10 is held as the intermediate result value x1 in the register 51-1. The contents of these registers 51-0 and 51-1 can be referred to from the main control unit 41.

At the next step S24, the selector 52B is controlled to select the register 51-1 and the selector 31 is controlled to select the weight value w1 of the register 32-1 to start the processing. At step S25, the neuron core 10 obtains the output data y1 by a multiply-accumulate operation. At step S26, the output data y1 is held at the register 51-2 as the intermediate result value x2. At this point in time, the input data x0 that was used for the initial processing is held in the register 51-0, the output data y0 that was obtained by the initial multiply-accumulate operation is held as the intermediate result value x1 in the register 51-1, and the output data y1 that was obtained by the second multiply-accumulate operation is held as the intermediate result value x2 in the register 51-2. The contents of these registers 51-0, 51-1, and 51-2 can be referred to by the main control unit 41.

At the next step S27, the selector 52B is controlled to select the register 51-2 and the selector 31 is controlled to select the weight value w2 of the register 32-2 to start the processing. At step S28, the neuron core 10 obtains the output data y2 by a multiply-accumulate operation. At step S29, the output data y2 (x3) is held in the register 51-3. At this point in time, the input data x0 that was used for the initial processing is held in the register 51-0, the output data y0 that was obtained by the initial multiply-accumulate operation is held as the intermediate result value x1 in the register 51-1, the output data y1 that was obtained by the second multiply-accumulate operation is held as the intermediate result value x2 in the register 51-2, and the output data y2 (x3) that was obtained by the third multiply-accumulate operation is held in the register 51-3. These can be referred to by the main control unit 41.

Next, a neural network according to a fifth embodiment realized by a three-serial connection (cascade connection) will be explained. The present embodiment, as shown by the bold arrows in FIG. 6A, is configured as the fourth embodiment (FIG. 5A) where the main control unit 41 can set the input data x0 of the initial period into the register (storage device) 51-0. The input data x0 arriving through the line I can also be set in the register (storage device) 51-0. The configuration of the present embodiment can be employed in all of the embodiments of the present invention.

The operation of the neural network according to the fifth embodiment is as shown in FIG. 6B. In the present embodiment, as described in FIG. 6B, at step S20 before the operation by the neuron core 10 is started, the input data x0 is held in the register 51-0 from the main control unit 41 through the sub-control unit 42. The following steps S21 to S29 are similar to the fourth embodiment explaining the operation using FIG. 5B, so the explanation will be omitted.

FIG. 7 is a view of the configuration of a neural network according to a sixth embodiment. The present embodiment is configured by the fourth embodiment in which the main control unit 41 can refer through the sub-control unit 42 to the input data x0 arriving from the prior stage through the line I before setting it in the register 51-0 (shown by bold arrows in FIG. 7). This configuration may be applied in all of the other embodiments as well. Due to this configuration, it is possible to quickly obtain a general picture of the state of output of the prior stage device without holding the output data in the register 51-0.

Further, the neural network according to the sixth embodiment employs a configuration where the main control unit 41 can refer to the results of processing by the neuron core 10 (output data "y") through the sub-control unit 42 (in FIG. 7, shown by bold arrows) before holding the output data in the registers 51-0 to 51-3 and the rest of the data-hold-supply control unit 50. This configuration can be employed if the embodiment can be realized by a serial connection (cascade connection). Due to this configuration, a general picture of the processing results using the neuron core 10 (output data "y") can be quickly obtained without holding the output data in the data-hold-supply control unit 50.

Figure 8:
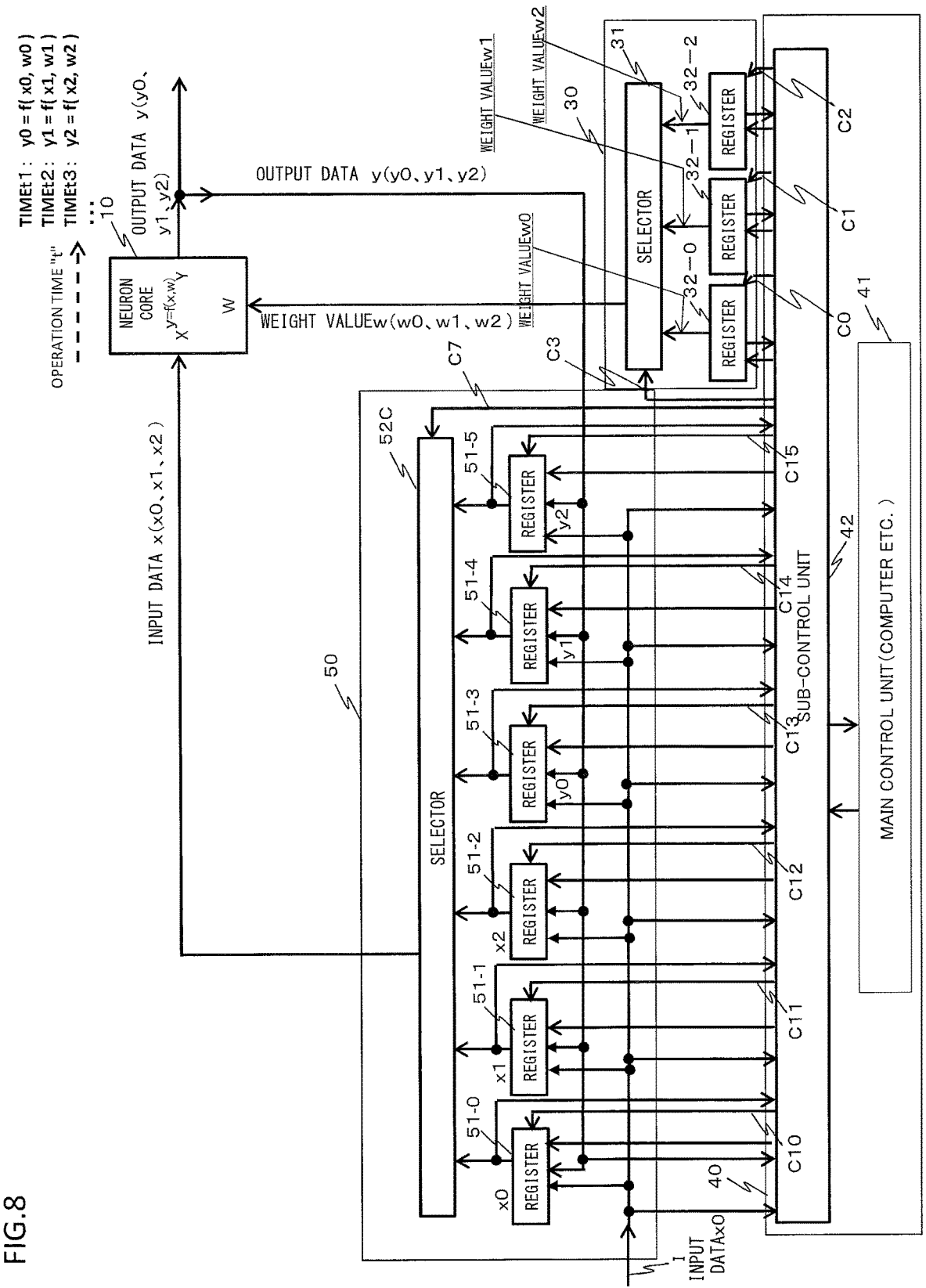
FIG. 8 is a view of the configuration of a neural network according to a seventh embodiment of the present invention.

FIG. 8 is a view of the configuration of a neural network according to a seventh embodiment. In the present embodiment, in the data-hold-supply control unit 50 of the sixth embodiment, two registers 51-4 and 51-5 are additionally provided. That is, in the embodiment of FIG. 8, FIG. 9, FIG. 9A, FIG. 9B, and FIG. 10, six registers 51-0, 51-1, 51-2, 51-3, 51-4, and 51-5 are provided. These six registers are controlled by sending to them through control signal lines C10, C11, C12, C13, C14, and C15, control signals having functions the same as the functions already explained in FIG. 3A (rendering them in states for receiving the output data). This embodiment can, for example, be realized by a three-parallel connection type neural network. Before performing the processing of the neural network, the main control unit 41 stores the weight values w0, w1, and w2 through the sub-control unit 42 in the registers 32-0 to 32-2 and, further, the main control unit 41 stores the input data "x" (x0, x1, x2) to be processed through the sub-control unit 42 in the registers 51-0 to 51-2. Of course, for example, the input data "x" (x0, x1, x2) arriving from the prior stage device through the input line I at three time slots may be stored in the registers 51-0 to 51-2.

The selector 31 and selector 52C are controlled by the main control unit 41 through the sub-control unit 42 to select the input data to be processed, select the weight value, and control the processing at the neuron core 10 to start the multiply-accumulate operation. The operation time is "t", the operation from the time t1 may be made y0=f(x0,w0), the operation from the time t2 may be made y1=f(x1,w1), and the operation from the time t3 may be made y2=f(x2, w2). Further, the selector 52C is controlled by the sub-control unit 42 under the direction of the main control unit 41 through the control signal line C6. Control based on the embodiment of FIG. 5A, FIG. 6A, and FIG. 7 is performed, which is similar to the embodiment of FIG. 9, FIG. 9A, FIG. 9B, and FIG. 10.

The output data y0 obtained by the processing from the time t1 can be stored in the register 51-3 under the direction of the main control unit 41, the output data y1 obtained by processing from the time t2 can be stored in the register 51-4 under the direction of the main control unit 41, and the output data y2 obtained by processing from the time t3 can be stored in the register 51-5 under the direction of the main control unit 41. The results stored in the registers 51-3, 51-4, and 51-5 can be read out by the main control unit 41 through the sub-control unit 42. Of course, the data stored in the registers 51-0, 51-1, and 51-2 can also be read out by the main control unit 41 through the sub-control unit 42.

Note that, the neural network according to the present embodiment, as indicated by the structure of FIG. 8, can be configured to operate as a parallel connection neural network by control of the selector 31 and selector 52C and, further, can be configured to operate as a mixed parallel connection and serial connection neural network.

Figure 9:
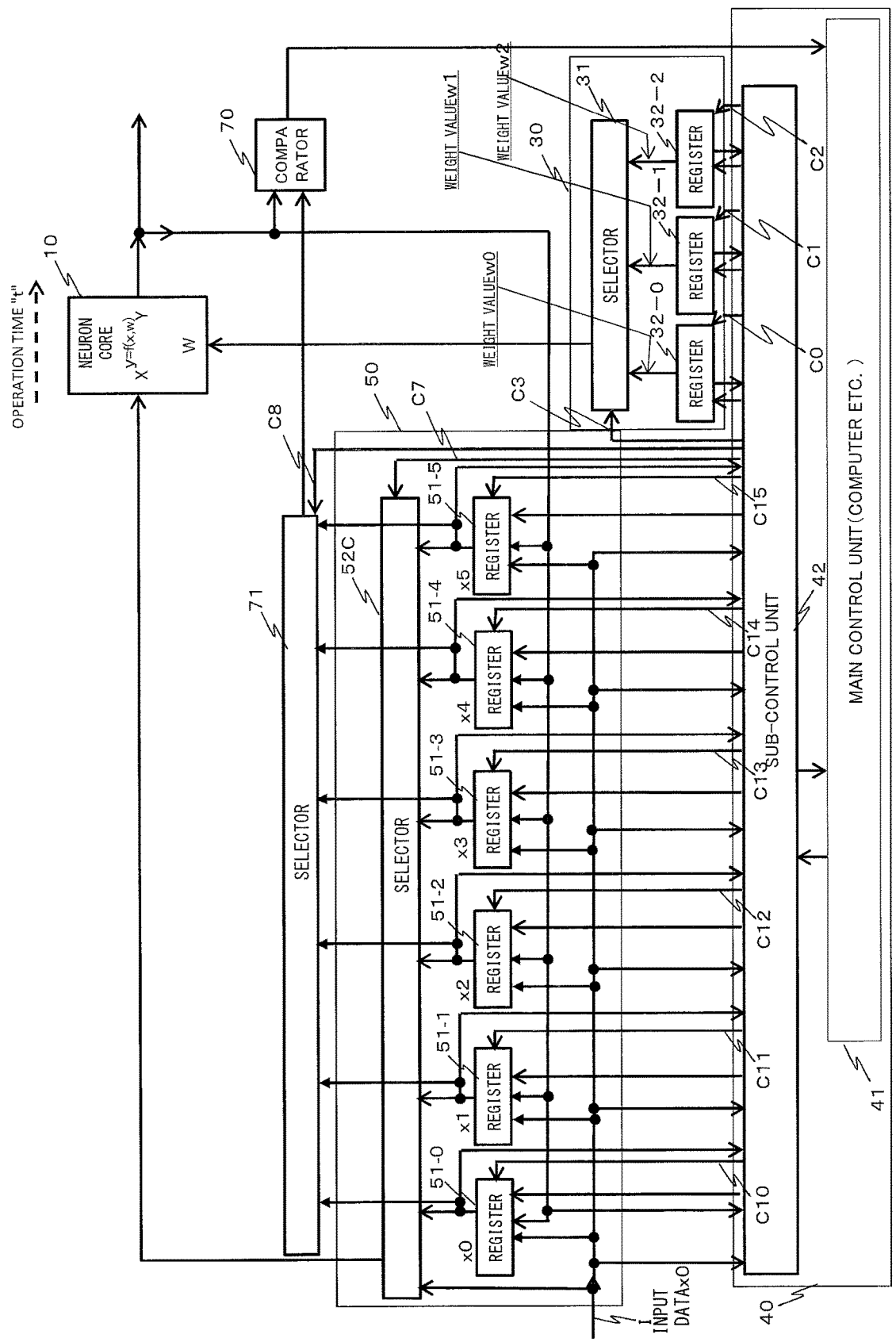
FIG. 9 is a view of the configuration of a neural network according to an eighth embodiment of the present invention.

FIG. 9 is a view of the configuration of a neural network according to an eighth embodiment. In the present embodiment, a comparator 70 is added to the configuration of the seventh embodiment. This comparator 70 compares any one of the sets of data at the data-hold-supply control unit 50 with the output data "y" from the data output terminal Y and notifies the main control unit 41 of the comparison results. In the present embodiment, a selector 71 is provided for selecting any one of the data x0 to x5 stored in the registers 51-0 to 51-5 of the data-hold-supply control unit 50 and supplying it to one input terminal at the comparator 70. In the present embodiment with comparator 70, for example, the sub-control unit 42, etc., may have the functions of comparison and notification. The comparator 70 or comparator need not to exist as independent hardware.

For example, this configuration can be used for a wakeup function or interrupt function where the comparator 70 provides notification when a fluctuation has occurred in the output data "y" of the neuron core 10 when storing the output data "y" of the neuron core 10 in one of registers 51-0 to 51-5, making the main control unit 41 shift to the sleep state or stopped state.

Figure 9A:
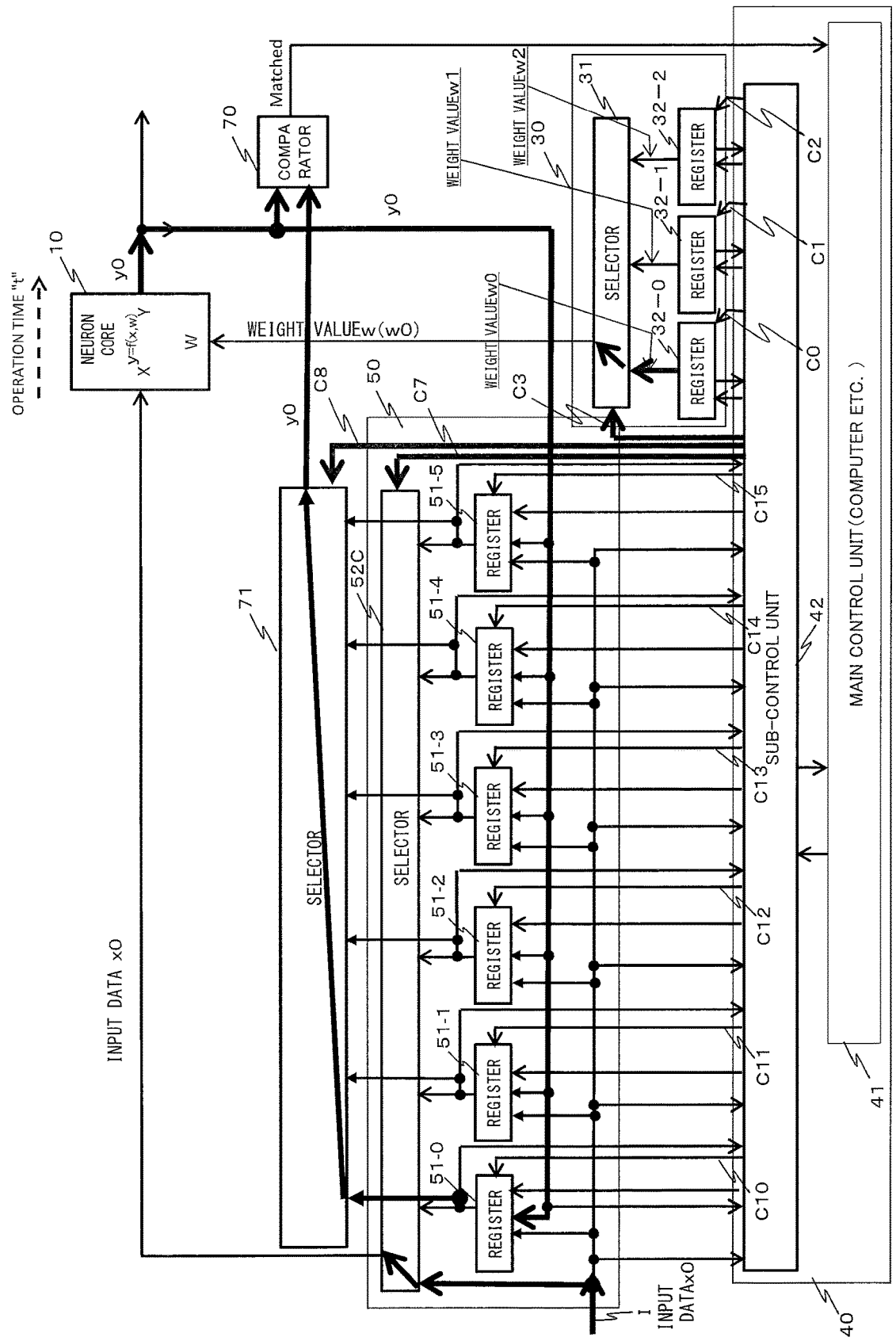
FIG. 9A is a view showing the operation of the neural network according to the eighth embodiment of the present invention in the case where notification is not performed by a comparator.

The operation of the neural network according to the eighth embodiment will be explained using FIG. 9A and FIG. 9B. In this operation, the register 51-0 of the data-hold-supply control unit 50 is used. FIG. 9A shows by the bold arrows the operation in the case where the comparison results of the comparator 70 match and the main control unit 41 is not notified of any fluctuation in the comparison results. Under the direction of the main control unit 41, the sub-control unit 42 sets the weight value w0 in the register 32-0. Next, the selector 52C is controlled to select the input data x0 arriving through the input line I and guide it to the input terminal X of the neuron core 10 while the selector 31 is controlled to guide the weight value w0 held at the register 32-0 to the weight value input terminal W of the neuron core 10.

The multiply-accumulate operation by the neuron core 10 is performed, the output data y0 is obtained and supplied to one input terminal of the comparator 70, and the register 51-0 is controlled to hold the output data y0. Here, the selector 71 is controlled to select the register 51-0 and transmit the data to the other input terminal of the comparator 70. At this time, the data y0 is set in the register 51-0, so the two sets of data supplied to the two input terminals of the comparator 70 match because they are both y0, therefore the comparator 70 does not send the main control unit 41 a signal notifying it of any fluctuation in the comparison results.

Figure 9B:
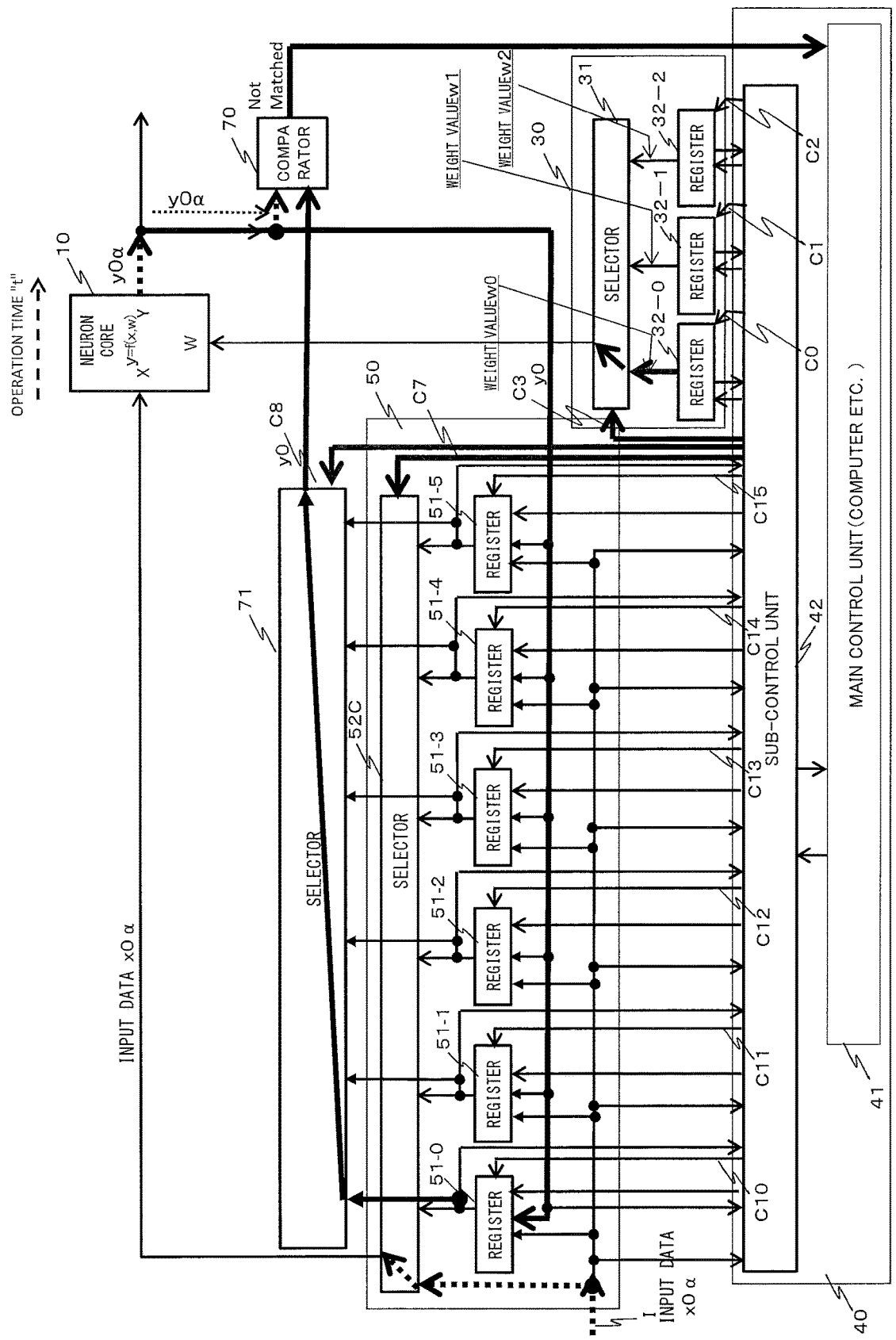
FIG. 9B is a view showing the operation of the neural network according to the eighth embodiment of the present invention in the case where notification is performed by a comparator.

The broken line arrows of FIG. 9B show the operation when the main control unit 41 is notified of a fluctuation in the operation results. If input data x0α arrives from the final state of FIG. 9A through the input line I, the selector 52C is controlled to select the input line I and the input data x0α is guided to the data input terminal X of the neuron core 10. In the neuron core 10, a multiply-accumulate operation using the input data x0α and the weight value w0 is performed whereby the output data y0α is obtained.

The output data y0α, as shown by the broken line arrows, is supplied to one input terminal of the comparator 70, a register 51-0 that previously held data y0 is selected, and data y0 is transmitted to the other input terminal of the comparator 70 so that comparison results do not match, and the comparator 70 sends a notification showing a fluctuation from the previous processing results to the main control unit 41.

Figure 10:
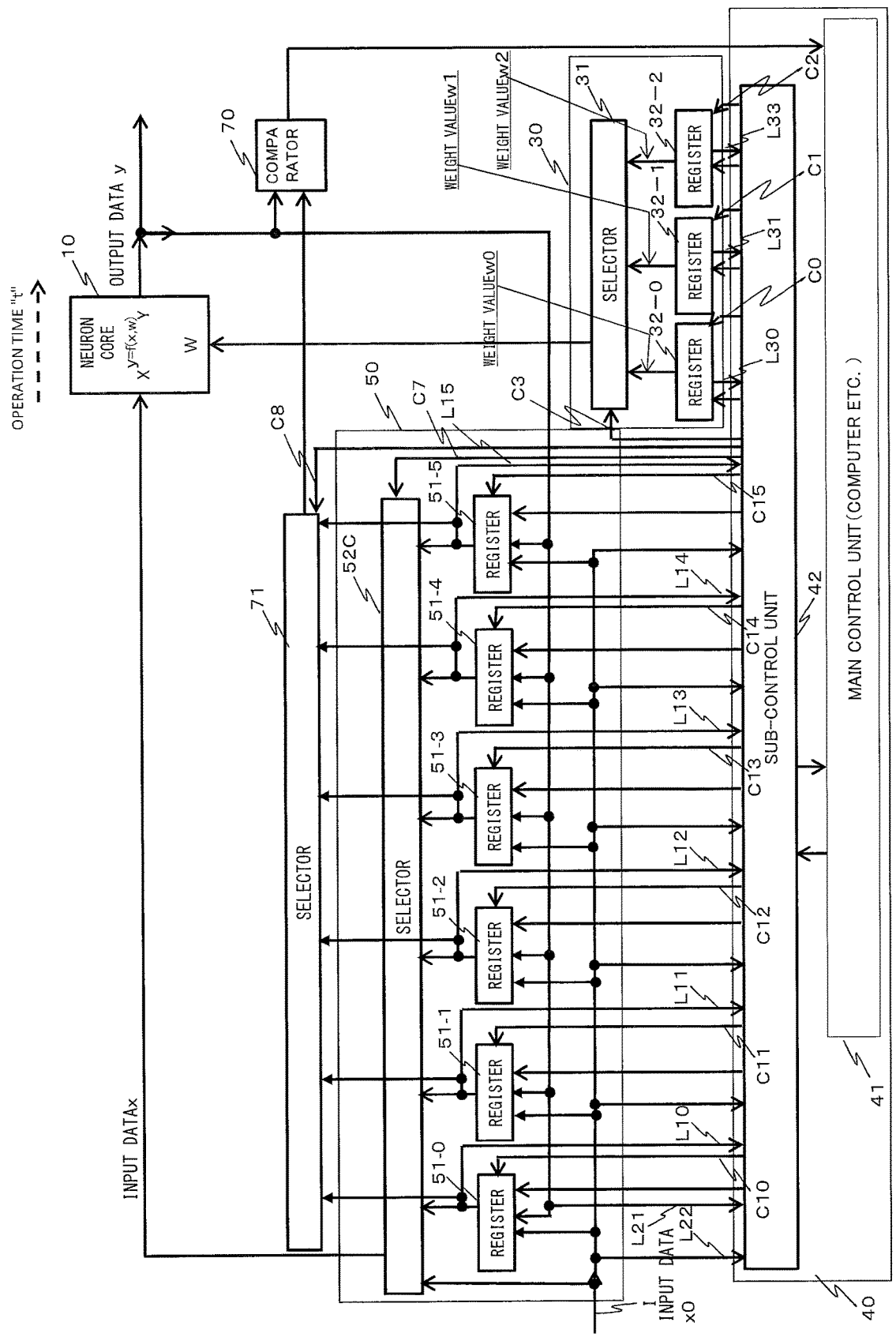
FIG. 10 is a view of the configuration of a neural network according to a ninth embodiment of the present invention.

FIG. 10 is a view of the configuration of a neural network according to a ninth embodiment. This embodiment has the same illustration as the neural network according to the eighth embodiment. Further, in the same way as the eighth embodiment, it is provided with the function of using a comparator 70 to provide a notification to the main control unit 41. In addition, it is also provided with the functions of the neural network according to the seventh embodiment explained in FIG. 8. That is, it is provided with the function of operating as a three-parallel connection neural network, the function of operating as a parallel connection neural network, and the function of operating as a mixed parallel connection and serial connection neural network. Further, it is also provided with the function of enabling the main control unit 41 to read the data stored in registers 51-0 to 51-5 through the lines L10 to L15 and the sub-control unit 42.

The present embodiment, in the same way as the neural network according to the sixth embodiment, is configured so that the main control unit 41 can refer to the input data x0 arriving from the prior stage through the line I, through the line L21 and the sub-control unit 42 before setting it into the register 51-0. Further, it is configured so that the main control unit 41 can refer to the output data "y" of the result of operation by the neuron core 10 through the line L22 and sub-control unit 42 before holding it in registers 51-0 to 51-5 and the rest of the data-hold-supply control unit 50.

Further, the present embodiment is provided with similar functions as the neural network according to the fifth embodiment. For example, it holds the input data x0 in the register 51-0 from the main control unit 41 through the sub-control unit 42 before processing by the neuron core 10 is started. That is, it supplies the input data x0 used in the operation by the neuron core 10 from the main control unit 41.

Further, the present embodiment is configured to be able to set the input data x0 at the initial time arriving from the prior stage device through the line I at any of the registers 51-0 to 51-5 and to be able to supply and hold the output data "y" output from the data output terminal Y of the neuron core 10 to any of the registers 51-0 to 51-5.

Furthermore, the present embodiment is configured so that the main control unit 41 can refer to the weight values "w" (w0, w1, and w2) stored in the registers 32-0, 32-1, and 32-2 of the weight-value-supply control unit 30 through the lines L30 to L32 and sub-control unit 42.

The number of registers holding the weight values "w" employed in the above embodiments (for example, 32-0 to 32-2) is not limited to 3 and may be any number. Further, the least number of registers for holding data (for example, 51-0 to 50-5) is not limited either. Further, the "first registers" in the claims correspond to the registers 32-0 to 32-2, while the "first selector" in the claims corresponds to the selector 31. Furthermore, the "second registers" in the claims correspond to the registers 51-0 to 51-5, while the "second selectors" in the claims correspond to the selectors 52, 52A, 52B, and 52C. Further, the selector 71 does not appear in the claims.

A plurality of embodiments according to the present invention were explained, but these embodiments are shown as illustrations and are not intended to limit the scope of the invention. These novel embodiments can be worked in various other ways. Elements can be variously omitted, replaced, or changed to an extent not departing from the gist of the invention. These embodiments and their modifications are included in the scope and gist of the invention and are included in the scope of the inventions described in the claims and their equivalents.

REFERENCE SIGNS LIST

The present disclosure relates to subject matter contained in Japanese Patent Application No. 2019-103803 (filed on Jun. 3, 2019), which is expressly incorporated herein by reference, in its entirely.

10 neuron core
30 weight-value-supply control unit
31 selector
32-0 to 32-2 registers
40 control-processor unit
41 main control unit
42 sub-control unit
50 data-hold-supply control unit
51-0 to 51-5 registers
52, 52A, 52B, 52C selector
70 comparator
71 selector
81 first interface
82 second interface

The invention claimed is:

1. A neural network comprising:
at least one neuron core having a data input terminal for receiving analog input data, a data output terminal for outputting analog output data, and a weight value input terminal, the neuron core being configured to perform an analog multiply-accumulate operation based on the analog input data arriving from the data input terminal and a weight value arriving from the weight value input terminal, the weight value being analog data;
a weight-value-supply control unit connected to the weight value input terminal and supplying the weight value from the weight value input terminal to said neuron core,
a control-processor unit controlling the supply of the weight value from said weight-value-supply control unit and processing the analog output data output from the data output terminal at every analog multiply-accumulate operation performed by said neuron core as serial data and/or parallel data; and
a data-hold-supply control unit connected to the data input terminal and the data output terminal, and provided with at least one second register and a second selector, the second register being configured to hold at least the analog output data operated by the neuron core and output from the data output terminal such that the hold data is suppliable to output to the second selector, and the second selector being capable of selecting any one of the at least one second register or an input data arriving from a prior stage, and wherein the second selector causes opening and closing a path for transmitting the held data in the second register to the data input terminal,
wherein said control-processor unit controls timing of holding data at the second register, and timing of opening and closing of the path, and controls the selecting operation of the second selector with respect to the input data from the prior stage and the hold data in the second registers.

2. The neural network according to claim 1, wherein said weight-value-supply control unit is provided with
a plurality of first registers respectively holding weight values and
a first selector for selecting any one of the plurality of first registers and opening and closing a path for transmitting the held weight value to the weight value input terminal.

3. The neural network according to claim 1, wherein said control-processor unit is configured by
 a main control unit controlling the overall neural network and
 a sub-control unit directly controlling said neuron core, said weight-value-supply control unit, and said data-hold-supply control unit based on instructions of said main control unit,
 said main control unit capable of setting the weight value at said weight-value-supply control unit and the data at said data-hold-supply control unit.

4. The neural network according to claim 3, which can refer to the weight value set at said weight-value-supply control unit and the data set at said data-hold-supply control unit from said main control unit.

5. The neural network according to claim 1, which compares the data set at said data-hold-supply control unit with the analog output data from the data output terminal, and notifies said main control unit of the comparison results.

6. A method of control of a neural network, the neural network comprising:
 at least one neuron core having a data input terminal for receiving analog input data, a data output terminal for outputting analog output data, and a weight value input terminal, the neuron core being configured to perform an analog multiply-accumulate operation based on the analog input data arriving from the data input terminal and a weight value arriving from the weight value input terminal, the weight value being analog data,
 a weight-value-supply control unit connected to the weight value input terminal and supplying the weight value from the weight value input terminal to said neuron core, and
 a data-hold-supply control unit provided with at least one second register and a second selector, the second register being configured to hold the analog output data operated by the neuron core and output from the data output terminal such that the hold data is suppliable to output to the second selector, and the second selector being capable of selecting any one of the at least one second register or an input data arriving from a prior stage, and wherein the second selector causes opening and closing a path for transmitting the held data in the second register to the data input terminal,
the method comprising:
 controlling the supply of a weight value from said weight-value-supply control unit;
  processing analog output data output from the data output terminal for every analog multiply-accumulate operation performed by said neuron core as serial data and/or parallel data;
  receiving and holding, at the at least one second register of the data-hold-supply control unit, the analog output data output from the data output terminal; and
  supplying the analog output data held by the at least one second register of the data-hold-supply control unit to the data input terminal of the neuron core having the data output terminal for use in the subsequent analog multiply-accumulate operation by the neuron core,
 wherein the method further comprises controlling timing of holding data at the second register of the data-hold-supply control unit and timing of opening and closing at the path, and controlling the selecting operation of the second selector with respect to the input data from the prior stage and the hold data in the second registers.

7. The method of control of a neural network according to claim 6, further comprising referring to data and a weight value set at said weight-value-supply control unit and data set at said data-hold-supply control unit.

8. The method of control of a neural network according to claim 6, further comprising comparing data set at said data-hold-supply control unit with analog output data from the data output terminal and controlling the state of the neural network based on the comparison results.

9. A processor of a neural network,
 the neural network comprising:
  at least one neuron core having a data input terminal for receiving analog input data, a data output terminal for outputting analog output data, and a weight value input terminal, the neuron core being configured to perform an analog multiply-accumulate operation based on the analog input data arriving from the data input terminal and a weight value arriving from the weight value input terminal, the weight value being analog data;
  a weight-value-supply control unit connected to the weight value input terminal and supplying the weight value from the weight value input terminal to said neuron core; and
  a data-hold-supply control unit connected to the data input terminal and the data output terminal, and provided with at least one second register and a second selector, the second register being configured to hold at least the analog output data operated by the neuron core and output from the data output terminal such that the hold data is suppliable to output to the second selector, and the second selector being capable of selecting any one of the at least one second register or an input data arriving from a prior stage, and wherein the second selector causes opening and closing a path for transmitting the held data in the second register to the data input termina,
 wherein, the processor is configured to:
  control the supply of the weight value from said weight-value-supply control unit;
  process the analog output data output from the data output terminal at every analog multiply-accumulate operation performed by said neuron core as serial data and/or parallel data;
  receive and hold, at the at least one second register of the data-hold-supply control unit, the analog output data output from the data output terminal; and
  supply the analog output data held by the at least one second register of the data-hold-supply control unit to the data input terminal of the neuron core having the data output terminal for use in the subsequent analog multiply-accumulate operation by the neuron core,
 wherein the processor is further configured to control timing of holding data at the second register of said data-hold-supply control unit and timing of opening and closing at the path, and controlling the selecting operation of the second selector with respect to the input data from the prior stage and the hold data in the second registers.

10. The processor of a neural network according to claim 9, wherein said weight-value-supply control unit comprises a plurality of first registers respectively holding weight values and
 a first selector for selecting any one of the plurality of registers and opening and closing a path for transmitting the held weight value to the weight value input terminal.

* * * * *